United States Patent
Holcomb et al.

(10) Patent No.: US 8,189,933 B2
(45) Date of Patent: May 29, 2012

(54) CLASSIFYING AND CONTROLLING ENCODING QUALITY FOR TEXTURED, DARK SMOOTH AND SMOOTH VIDEO CONTENT

(75) Inventors: Thomas W. Holcomb, Bothell, WA (US); Stacey Spears, Sammamish, WA (US); Cheng Chang, Redmond, WA (US); Chih-Lung Lin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1094 days.

(21) Appl. No.: 12/080,406

(22) Filed: Mar. 31, 2008

(65) Prior Publication Data
US 2009/0245587 A1 Oct. 1, 2009

(51) Int. Cl.
*G06K 9/36* (2006.01)
(52) U.S. Cl. ...................................... 382/232
(58) Field of Classification Search ............... 382/232, 382/236, 238–239, 244–253; 348/394.1, 348/395.1, 399.1, 400.1–405.1, 409.1–418.1; 375/240.01–240.08, 240.12–240.24
See application file for complete search history.

(56) References Cited

U.S. PATENT DOCUMENTS

| | | |
|---|---|---|
| 762,026 A | 6/1904 | Connstein |
| 4,583,114 A | 4/1986 | Catros |
| 4,679,079 A | 7/1987 | Catros et al. |
| 4,774,574 A | 9/1988 | Daly et al. |
| 4,821,119 A | 4/1989 | Gharavi |
| 4,862,264 A | 8/1989 | Wells et al. |
| 4,965,830 A | 10/1990 | Barham et al. |
| 4,992,889 A | 2/1991 | Yamagami et al. |
| 5,072,295 A | 12/1991 | Murakami et al. |
| 5,128,758 A | 7/1992 | Azadegan et al. |
| 5,136,377 A | 8/1992 | Johnston et al. |
| 5,144,426 A | 9/1992 | Tanaka et al. |
| 5,179,442 A | 1/1993 | Azadegan et al. |
| 5,237,410 A | 8/1993 | Inoue |
| 5,241,395 A | 8/1993 | Chen |
| 5,253,058 A | 10/1993 | Gharavi |

(Continued)

FOREIGN PATENT DOCUMENTS
CA 1327074 2/1994
(Continued)

OTHER PUBLICATIONS
Calderbank et al., "Wavelet transforms that map integers to integers," Mathematics Subject Classification, Aug. 1996, 39 pages.

(Continued)

*Primary Examiner* — Jose Couso
(74) *Attorney, Agent, or Firm* — Klarquist Sparkman, LLP

(57) ABSTRACT

Techniques and tools for content classification and adaptive quantization are described. In an example implementation, a video encoding tool classifies blocks as textured, dark smooth or other smooth. The tool classifies a block as textured or non-textured by comparing the energy of AC coefficients for the block to a texture threshold, which can be set using a non-linear mapping of possible texture classification levels to possible texture thresholds. If a block is not textured, the tool further classifies the block as dark smooth or smooth depending on average intensity value for the block. Using the classification information and one or more control parameters to control bit allocation for dark smooth content relative to other smooth content, the tool encodes the video and outputs encoded video information. Example multi-pass approaches to setting the control parameters are also described.

19 Claims, 9 Drawing Sheets

Software 380 implementing encoder or other tool that controls encoding quality for textured, dark smooth and other smooth video content

U.S. PATENT DOCUMENTS

| | | | |
|---|---|---|---|
| 5,263,088 A | 11/1993 | Hazu et al. |
| 5,301,242 A | 4/1994 | Gonzales et al. |
| 5,303,058 A | 4/1994 | Fukuda et al. |
| 5,317,396 A | 5/1994 | Fujinami |
| 5,317,672 A | 5/1994 | Crossman et al. |
| 5,333,212 A | 7/1994 | Ligtenberg |
| 5,351,310 A | 9/1994 | Califano et al. |
| 5,374,958 A | 12/1994 | Yanagihara |
| 5,412,429 A | 5/1995 | Glover |
| 5,452,104 A | 9/1995 | Lee |
| 5,461,421 A | 10/1995 | Moon |
| 5,473,377 A | 12/1995 | Kim |
| 5,481,553 A | 1/1996 | Suzuki et al. |
| 5,506,916 A | 4/1996 | Nishihara et al. |
| 5,510,785 A | 4/1996 | Segawa et al. |
| 5,537,440 A | 7/1996 | Eyuboglu et al. |
| 5,537,493 A | 7/1996 | Wilkinson |
| 5,539,469 A | 7/1996 | Jung |
| 5,559,557 A | 9/1996 | Kato |
| 5,565,920 A | 10/1996 | Lee et al. |
| 5,587,708 A | 12/1996 | Chiu |
| 5,606,371 A | 2/1997 | Gunnewiek et al. |
| 5,623,424 A | 4/1997 | Azadegan et al. |
| 5,631,644 A | 5/1997 | Katata et al. |
| 5,654,760 A | 8/1997 | Ohtsuki |
| 5,657,087 A | 8/1997 | Jeong et al. |
| 5,663,763 A | 9/1997 | Yagasaki et al. |
| 5,724,097 A | 3/1998 | Hibi et al. |
| 5,724,456 A | 3/1998 | Boyack et al. |
| 5,731,836 A | 3/1998 | Lee |
| 5,731,837 A | 3/1998 | Hurst, Jr. |
| 5,739,861 A | 4/1998 | Music |
| 5,751,358 A | 5/1998 | Suzuki et al. |
| 5,751,379 A | 5/1998 | Markandey et al. |
| 5,761,088 A | 6/1998 | Hulyalkar et al. |
| 5,764,803 A | 6/1998 | Jacquin et al. |
| 5,781,788 A | 7/1998 | Woo et al. |
| 5,786,856 A | 7/1998 | Hall et al. |
| 5,802,213 A | 9/1998 | Gardos |
| 5,809,178 A | 9/1998 | Anderson et al. |
| 5,815,097 A | 9/1998 | Schwartz et al. |
| 5,819,035 A | 10/1998 | Devaney et al. |
| 5,825,310 A | 10/1998 | Tsutsui |
| 5,835,145 A | 11/1998 | Ouyang et al. |
| 5,835,237 A | 11/1998 | Ebrahimi |
| 5,844,613 A | 12/1998 | Chaddha |
| 5,850,482 A | 12/1998 | Meany et al. |
| 5,867,167 A | 2/1999 | Deering |
| 5,870,435 A | 2/1999 | Choi et al. |
| 5,877,813 A | 3/1999 | Lee et al. |
| 5,878,166 A | 3/1999 | Legall |
| 5,880,775 A | 3/1999 | Ross |
| 5,883,672 A | 3/1999 | Suzuki et al. |
| 5,926,791 A | 7/1999 | Ogata et al. |
| 5,969,764 A | 10/1999 | Sun et al. |
| 5,970,173 A | 10/1999 | Lee et al. |
| 5,990,957 A | 11/1999 | Ryoo |
| 6,044,115 A | 3/2000 | Horiike et al. |
| 6,049,630 A | 4/2000 | Wang et al. |
| 6,058,362 A | 5/2000 | Malvar |
| 6,072,831 A | 6/2000 | Chen |
| 6,084,636 A | 7/2000 | Sugahara et al. |
| 6,088,392 A | 7/2000 | Rosenberg |
| 6,091,777 A | 7/2000 | Guetz et al. |
| 6,104,751 A | 8/2000 | Artieri |
| 6,118,817 A | 9/2000 | Wang |
| 6,118,903 A | 9/2000 | Liu |
| 6,125,140 A | 9/2000 | Wilkinson |
| 6,148,107 A | 11/2000 | Ducloux et al. |
| 6,148,109 A | 11/2000 | Boon et al. |
| 6,160,846 A | 12/2000 | Chiang et al. |
| 6,167,091 A | 12/2000 | Okada et al. |
| 6,182,034 B1 | 1/2001 | Malvar |
| 6,212,232 B1 | 4/2001 | Reed et al. |
| 6,215,905 B1 | 4/2001 | Lee et al. |
| 6,223,162 B1 | 4/2001 | Chen et al. |
| 6,240,135 B1 | 5/2001 | Kim |
| 6,240,380 B1 | 5/2001 | Malvar |
| 6,243,497 B1 | 6/2001 | Chiang et al. |
| 6,249,614 B1 | 6/2001 | Kolesnik et al. |
| 6,256,422 B1 | 7/2001 | Mitchell et al. |
| 6,256,423 B1 | 7/2001 | Krishnamurthy et al. |
| 6,263,022 B1 | 7/2001 | Chen et al. |
| 6,263,024 B1 | 7/2001 | Matsumoto |
| 6,275,614 B1 | 8/2001 | Krishnamurthy et al. |
| 6,278,735 B1 | 8/2001 | Mohsenian |
| 6,292,588 B1 | 9/2001 | Shen et al. |
| 6,314,208 B1 | 11/2001 | Konstantinides et al. |
| 6,337,881 B1 | 1/2002 | Chaddha |
| 6,347,116 B1 | 2/2002 | Haskell et al. |
| 6,348,945 B1 | 2/2002 | Hayakawa |
| 6,356,709 B1 | 3/2002 | Abe et al. |
| 6,359,928 B1 | 3/2002 | Wang et al. |
| 6,360,017 B1 | 3/2002 | Chiu et al. |
| 6,370,502 B1 | 4/2002 | Wu et al. |
| 6,373,894 B1 | 4/2002 | Florencio et al. |
| 6,385,343 B1 | 5/2002 | Kuroda et al. |
| 6,389,171 B1 | 5/2002 | Washington |
| 6,393,155 B1 | 5/2002 | Bright et al. |
| 6,408,026 B1 | 6/2002 | Tao |
| 6,418,166 B1 | 7/2002 | Wu et al. |
| 6,438,167 B1 | 8/2002 | Shimizu et al. |
| 6,456,744 B1 | 9/2002 | Lafe |
| 6,463,100 B1 | 10/2002 | Cho et al. |
| 6,466,620 B1 | 10/2002 | Lee |
| 6,473,534 B1 | 10/2002 | Merhav et al. |
| 6,490,319 B1 | 12/2002 | Yang |
| 6,493,385 B1 | 12/2002 | Sekiguchi et al. |
| 6,519,284 B1 | 2/2003 | Pesquet-Popescu et al. |
| 6,526,096 B2 | 2/2003 | Lainema et al. |
| 6,546,049 B1 | 4/2003 | Lee |
| 6,571,019 B1 | 5/2003 | Kim et al. |
| 6,593,925 B1 | 7/2003 | Hakura et al. |
| 6,600,836 B1 | 7/2003 | Thyagarajan et al. |
| 6,647,152 B2 | 11/2003 | Willis et al. |
| 6,654,417 B1 | 11/2003 | Hui |
| 6,678,422 B1 | 1/2004 | Sharma et al. |
| 6,687,294 B2 | 2/2004 | Yan et al. |
| 6,704,718 B2 | 3/2004 | Burges et al. |
| 6,721,359 B1 | 4/2004 | Bist et al. |
| 6,728,317 B1 | 4/2004 | Demos |
| 6,731,811 B1 | 5/2004 | Rose |
| 6,738,423 B1 | 5/2004 | Lainema et al. |
| 6,747,660 B1 | 6/2004 | Olano et al. |
| 6,759,999 B1 | 7/2004 | Doyen |
| 6,760,482 B1 | 7/2004 | Taubman |
| 6,765,962 B1 | 7/2004 | Lee et al. |
| 6,771,830 B2 | 8/2004 | Goldstein et al. |
| 6,785,331 B1 | 8/2004 | Jozawa et al. |
| 6,788,740 B1 | 9/2004 | van der Schaar et al. |
| 6,792,157 B1 | 9/2004 | Koshi et al. |
| 6,795,584 B2 | 9/2004 | Karczewicz et al. |
| 6,801,572 B2 | 10/2004 | Yamada et al. |
| 6,807,317 B2 | 10/2004 | Mathew et al. |
| 6,810,083 B2 | 10/2004 | Chen et al. |
| 6,831,947 B2 | 12/2004 | Ribas Corbera |
| 6,862,320 B1 | 3/2005 | Isu et al. |
| 6,865,291 B1 | 3/2005 | Zador |
| 6,873,654 B1 | 3/2005 | Rackett |
| 6,876,703 B2 | 4/2005 | Ismaeil et al. |
| 6,882,753 B2 | 4/2005 | Chen et al. |
| 6,907,142 B2 | 6/2005 | Kalevo et al. |
| 6,909,745 B1 | 6/2005 | Puri et al. |
| 6,947,045 B1 | 9/2005 | Ostermann et al. |
| 6,975,680 B2 | 12/2005 | Demos |
| 6,977,659 B2 * | 12/2005 | Dumitras et al. ............ 345/582 |
| 6,983,018 B1 | 1/2006 | Lin et al. |
| 6,990,242 B2 | 1/2006 | Malvar |
| 7,016,546 B2 | 3/2006 | Fukuhara et al. |
| 7,020,204 B2 | 3/2006 | Auvray et al. |
| 7,027,506 B2 | 4/2006 | Lee et al. |
| 7,027,507 B2 | 4/2006 | Wu |
| 7,035,473 B1 | 4/2006 | Zeng et al. |
| 7,042,941 B1 | 5/2006 | Laksono et al. |
| 7,058,127 B2 | 6/2006 | Lu et al. |
| 7,099,389 B1 | 8/2006 | Yu et al. |
| 7,099,515 B2 | 8/2006 | Lin et al. |

| | | |
|---|---|---|
| 7,110,455 B2 | 9/2006 | Wu et al. |
| 7,162,096 B1 | 1/2007 | Horowitz |
| 7,200,277 B2 | 4/2007 | Joshi et al. |
| 7,289,154 B2 | 10/2007 | Gindele |
| 7,295,609 B2 | 11/2007 | Sato et al. |
| 7,301,999 B2 | 11/2007 | Filippini et al. |
| 7,307,639 B1 * | 12/2007 | Dumitras et al. ............ 345/582 |
| 7,356,085 B2 | 4/2008 | Gavrilescu et al. |
| 7,463,780 B2 | 12/2008 | Fukuhara et al. |
| 7,471,830 B2 | 12/2008 | Lim et al. |
| 7,580,584 B2 | 8/2009 | Holcomb et al. |
| 7,738,554 B2 | 6/2010 | Lin et al. |
| 7,778,476 B2 | 8/2010 | Alvarez et al. |
| 7,801,383 B2 | 9/2010 | Sullivan |
| 7,869,517 B2 | 1/2011 | Ghanbari |
| 7,889,790 B2 | 2/2011 | Sun |
| 7,995,649 B2 * | 8/2011 | Zuo et al. ............... 375/240.03 |
| 2001/0048718 A1 | 12/2001 | Bruls et al. |
| 2002/0021756 A1 | 2/2002 | Jayant et al. |
| 2002/0044602 A1 | 4/2002 | Ohki |
| 2002/0118748 A1 | 8/2002 | Inomata et al. |
| 2002/0118884 A1 | 8/2002 | Cho et al. |
| 2002/0136308 A1 | 9/2002 | Le Maguet et al. |
| 2002/0154693 A1 | 10/2002 | Demos et al. |
| 2002/0186890 A1 | 12/2002 | Lee et al. |
| 2003/0021482 A1 | 1/2003 | Lan et al. |
| 2003/0053702 A1 | 3/2003 | Hu |
| 2003/0095599 A1 | 5/2003 | Lee et al. |
| 2003/0103677 A1 | 6/2003 | Tastl et al. |
| 2003/0108100 A1 | 6/2003 | Sekiguchi et al. |
| 2003/0113026 A1 | 6/2003 | Srinivasan et al. |
| 2003/0128754 A1 | 7/2003 | Akimoto et al. |
| 2003/0128756 A1 | 7/2003 | Oktem |
| 2003/0138150 A1 | 7/2003 | Srinivasan |
| 2003/0185420 A1 | 10/2003 | Sefcik et al. |
| 2003/0194010 A1 | 10/2003 | Mukerjee et al. |
| 2003/0206582 A1 | 11/2003 | Srinivasan et al. |
| 2003/0215011 A1 | 11/2003 | Wang et al. |
| 2003/0219073 A1 | 11/2003 | Lee et al. |
| 2003/0223493 A1 | 12/2003 | Ye et al. |
| 2004/0008901 A1 | 1/2004 | Avinash |
| 2004/0022316 A1 | 2/2004 | Ueda et al. |
| 2004/0036692 A1 | 2/2004 | Alcorn et al. |
| 2004/0090397 A1 | 5/2004 | Doyen et al. |
| 2004/0091168 A1 | 5/2004 | Jones et al. |
| 2004/0151243 A1 | 8/2004 | Bhaskaran et al. |
| 2004/0158719 A1 | 8/2004 | Lee et al. |
| 2004/0190610 A1 | 9/2004 | Song et al. |
| 2004/0202376 A1 | 10/2004 | Schwartz et al. |
| 2004/0228406 A1 | 11/2004 | Song |
| 2004/0264568 A1 | 12/2004 | Florencio |
| 2004/0264580 A1 | 12/2004 | Chiang Wei Yin et al. |
| 2005/0002575 A1 | 1/2005 | Joshi et al. |
| 2005/0008075 A1 | 1/2005 | Chang |
| 2005/0013365 A1 | 1/2005 | Mukerjee et al. |
| 2005/0013497 A1 | 1/2005 | Hsu et al. |
| 2005/0013498 A1 | 1/2005 | Srinivasan et al. |
| 2005/0013500 A1 | 1/2005 | Lee et al. |
| 2005/0015246 A1 | 1/2005 | Thumpudi et al. |
| 2005/0015259 A1 | 1/2005 | Thumpudi et al. |
| 2005/0024487 A1 | 2/2005 | Chen |
| 2005/0031034 A1 | 2/2005 | Kamaci et al. |
| 2005/0036698 A1 | 2/2005 | Beom |
| 2005/0036699 A1 | 2/2005 | Holcomb et al. |
| 2005/0041738 A1 | 2/2005 | Lin et al. |
| 2005/0052294 A1 | 3/2005 | Liang et al. |
| 2005/0053151 A1 | 3/2005 | Lin et al. |
| 2005/0053158 A1 | 3/2005 | Regunathan et al. |
| 2005/0084009 A1 | 4/2005 | Furukawa et al. |
| 2005/0084013 A1 | 4/2005 | Wang et al. |
| 2005/0094731 A1 | 5/2005 | Xu et al. |
| 2005/0105612 A1 | 5/2005 | Sung et al. |
| 2005/0105622 A1 | 5/2005 | Gokhale |
| 2005/0123274 A1 | 6/2005 | Crinon et al. |
| 2005/0135484 A1 | 6/2005 | Lee et al. |
| 2005/0147163 A1 | 7/2005 | Li et al. |
| 2005/0152451 A1 | 7/2005 | Byun |
| 2005/0180500 A1 | 8/2005 | Chiang et al. |
| 2005/0180502 A1 | 8/2005 | Puri |
| 2005/0190836 A1 | 9/2005 | Lu et al. |
| 2005/0207492 A1 | 9/2005 | Pao |
| 2005/0232501 A1 | 10/2005 | Mukerjee |
| 2005/0238096 A1 | 10/2005 | Holcomb et al. |
| 2005/0254719 A1 | 11/2005 | Sullivan |
| 2005/0259729 A1 | 11/2005 | Sun |
| 2005/0276493 A1 | 12/2005 | Xin et al. |
| 2006/0013307 A1 | 1/2006 | Olivier et al. |
| 2006/0013309 A1 | 1/2006 | Ha et al. |
| 2006/0018552 A1 | 1/2006 | Malayath et al. |
| 2006/0034368 A1 | 2/2006 | Klivington |
| 2006/0038826 A1 | 2/2006 | Daly |
| 2006/0056508 A1 | 3/2006 | Lafon et al. |
| 2006/0071825 A1 | 4/2006 | Demos |
| 2006/0083308 A1 | 4/2006 | Schwarz et al. |
| 2006/0088098 A1 | 4/2006 | Vehvilainen |
| 2006/0098733 A1 | 5/2006 | Matsumura et al. |
| 2006/0104350 A1 | 5/2006 | Liu |
| 2006/0104527 A1 | 5/2006 | Koto et al. |
| 2006/0126724 A1 | 6/2006 | Cote et al. |
| 2006/0126728 A1 | 6/2006 | Yu et al. |
| 2006/0133478 A1 | 6/2006 | Wen |
| 2006/0133479 A1 | 6/2006 | Chen et al. |
| 2006/0140267 A1 | 6/2006 | He et al. |
| 2006/0165176 A1 | 7/2006 | Raveendran et al. |
| 2006/0188014 A1 | 8/2006 | Civanlar et al. |
| 2006/0197777 A1 | 9/2006 | Cha et al. |
| 2006/0227868 A1 | 10/2006 | Chen et al. |
| 2006/0238444 A1 | 10/2006 | Wang et al. |
| 2006/0239576 A1 | 10/2006 | Mukherjee |
| 2006/0245506 A1 | 11/2006 | Lin et al. |
| 2006/0256851 A1 | 11/2006 | Wang et al. |
| 2006/0256867 A1 | 11/2006 | Turaga et al. |
| 2006/0257037 A1 | 11/2006 | Samadani |
| 2006/0268990 A1 | 11/2006 | Lin et al. |
| 2006/0268991 A1 | 11/2006 | Segall et al. |
| 2007/0002946 A1 | 1/2007 | Bouton et al. |
| 2007/0009039 A1 | 1/2007 | Ryu |
| 2007/0009042 A1 | 1/2007 | Craig et al. |
| 2007/0053603 A1 | 3/2007 | Monro |
| 2007/0081588 A1 | 4/2007 | Raveendran et al. |
| 2007/0140333 A1 | 6/2007 | Chono et al. |
| 2007/0147497 A1 | 6/2007 | Bao et al. |
| 2007/0160138 A1 | 7/2007 | Wedi et al. |
| 2007/0160151 A1 | 7/2007 | Bolton et al. |
| 2007/0189626 A1 | 8/2007 | Tanizawa et al. |
| 2007/0201553 A1 | 8/2007 | Shindo |
| 2007/0230565 A1 | 10/2007 | Tourapis et al. |
| 2007/0237221 A1 | 10/2007 | Hsu et al. |
| 2007/0237222 A1 | 10/2007 | Xia et al. |
| 2007/0237236 A1 | 10/2007 | Chang et al. |
| 2007/0237237 A1 | 10/2007 | Chang et al. |
| 2007/0248163 A1 | 10/2007 | Zuo et al. |
| 2007/0248164 A1 | 10/2007 | Zuo et al. |
| 2007/0258518 A1 | 11/2007 | Tu et al. |
| 2007/0258519 A1 | 11/2007 | Srinivasan |
| 2008/0008394 A1 | 1/2008 | Segall |
| 2008/0031346 A1 | 2/2008 | Segall |
| 2008/0068446 A1 | 3/2008 | Barkley et al. |
| 2008/0080615 A1 | 4/2008 | Tourapis et al. |
| 2008/0089410 A1 | 4/2008 | Lu et al. |
| 2008/0101465 A1 | 5/2008 | Chono et al. |
| 2008/0187042 A1 | 8/2008 | Jasinschi |
| 2008/0192822 A1 | 8/2008 | Chang et al. |
| 2008/0240250 A1 | 10/2008 | Lin et al. |
| 2008/0240257 A1 | 10/2008 | Chang et al. |
| 2008/0260278 A1 | 10/2008 | Zuo et al. |
| 2008/0304562 A1 | 12/2008 | Chang et al. |
| 2009/0207919 A1 | 8/2009 | Yin et al. |
| 2009/0213930 A1 | 8/2009 | Ye et al. |
| 2009/0290635 A1 | 11/2009 | Kim et al. |
| 2009/0296808 A1 | 12/2009 | Regunathan et al. |
| 2010/0177826 A1 | 7/2010 | Bhaumik et al. |

FOREIGN PATENT DOCUMENTS

| | | |
|---|---|---|
| EP | 0932306 | 7/1999 |
| EP | 1465349 | 10/2004 |
| EP | 1871113 | 12/2007 |
| GB | 897363 | 5/1962 |

| | | |
|---|---|---|
| JP | 05-227525 | 9/1993 |
| JP | 07-222145 | 8/1995 |
| JP | 07-250327 | 9/1995 |
| JP | 08-336139 | 12/1996 |
| JP | 10-336656 | 12/1998 |
| JP | 11-041610 | 2/1999 |
| JP | 2003061090 | 2/2003 |
| JP | 6-296275 | 10/2004 |
| JP | 2007-281949 | 10/2007 |
| KR | 132895 | 10/1998 |
| WO | WO 97/21302 | 6/1997 |
| WO | WO 99/48300 | 9/1999 |
| WO | WO 00/21207 | 4/2000 |
| WO | WO 00/72599 | 11/2000 |
| WO | WO 02/07438 | 1/2002 |
| WO | WO 2004/100554 | 11/2004 |
| WO | WO 2004/100556 | 11/2004 |
| WO | WO 2005/065030 | 7/2005 |
| WO | WO 2006/075895 | 7/2006 |
| WO | WO 2006/112620 | 10/2006 |
| WO | WO 2007/015047 | 2/2007 |
| WO | WO 2007/130580 | 11/2007 |

OTHER PUBLICATIONS

Donoho et al., "Data compression and Harmonic Analysis," IEEE transaction on information theory, vol. 44, No. 6, Oct. 1998, pp. 2435-2476.

ISO/IEC, "Study text (version 3) of ISO/IEC 14496-10:2005/FPDAM3 Scalable Video Coding (in integrated form with ISO/IEC 14996-10)," ISO/IEC JTC 1/SC 29/WG 11 N8962, pp. 59-103, 175-196, 404-423, 453-470 (Apr. 2007).

ITU-T, "CCITT Recommendation T.81: Information Technology—Digital Compresion and Coding of Continuous-Tone Still Images—Requirements and Guidelines," 190 pp. (Sep. 1992).

ITU-T, "ITU-T Recommendation T.84: Terminals for Telematic Services—Information Technology—Digital Compression and Coding of Continuous-Tone Still Images: Extensions," 84 pp. (Jul. 1996).

ITU-T, "ITU-T Recommendation T.801: JPEG 2000 image coding system: Extensions," 334 pp. (Aug. 2002).

Man et al., "Three-Dimensional Subband Coding Techniques for Wireless Video Communications," IEEE Trans. on Circuits and Systems for Video Technology, vol. 12, No. 6, pp. 386-397 (Jun. 2002).

Marcellin et al., "An overview of quantization in JPEG 2000," Signal Processing: Image Communication, vol. 17, pp. 73-84 (Jan. 2002).

Srinivasan et al., "HD Photo: A new image coding technology for digital photography," Proc. of SPIE, Vo. 6696, 19 pp. (Jan. 2007).

Tong, "A perceptually adaptive JPEG coder," Thesis, University of Toronto, 124 pp. (1997).

Watson, "Perceptual Optimization of DCT Color Quantization Matrices," IEEE Conf. On Image Processing, pp. 100-104 (Nov. 1994).

Yoo et al., "Adaptive Quantization of Image Subbands with Efficient Overhead Rate Selection," IEEE Conf. on Image Processing, pp. 361-364 (Sep. 1996).

Atzori et al., "Adaptive Anisotropic Filtering (AAF) for Real-Time Visual Enhancement of MPEG-Coded Video Sequences," IEEE Transactions on Circuits and Systems for Video Technology, vol. 12, No. 5, pp. 285-298 (May 2002).

Augustine et al., "Region of Interest Editing of MPEG-2 Video Streams in the Compressed Domain," 2004 IEEE Int '1 Conf on Multimedia and Expo: ICME'04, vol. 1, Issue 27-30, pp. 559-562 (Jun. 2004).

Bist et al., "Adaptive Quantization for Low Bit Rate Video Coding," Proc. 1998 Int'l Conf. on Image Processing (ICIP 98), pp. 925-928 (Oct. 1998).

Chang et al., "Adaptive Wavelet Thresholding for Image Denoising and Compression," IEEE Trans on Image Processing, vol. 9, No. 9, pp. 1532-1546 (Sep. 2000).

Chrysafis et al., "Context-based Adaptive Image Coding," Proc. of the 30th Asilomar Conf. on Signals, Systems, and Computers, 5 pp. (Nov. 1996).

De Simone, et al., "A comparative study of JPEG 2000, AVC/H.264, and HD Photo," SPIE Optics and Photonics, Applications of Digital Image Processing XXX, 12 pp. (Aug. 2007).

Farvardin et al., "Optimum quantizer performance for a class of non-Gaussian memoryless sources," IEEE Trans. Inform. Theory, vol. IT-30, No. 3, pp. 485-497 (May 1984).

Flierl et al., "A Video Codec Incorporating Block-Based Multi-Hypothesis Motion-Compensated Prediction," in Proceedings of the SPIE Conference on Visual Communications and Image Processing, Perth, Australia, vol. 4067, pp. 238-249 (Jun. 2000).

Flierl et al., "Generalized B Pictures and the Draft H.264/AVC Video Compression Standard," in IEEE Transactions on Circuits and Systems for Video Technology, vol. 13, No. 7, pp. 587-597 (Jul. 2003).

Foos et al., "JPEG 2000 compression of medical imagery," Proc. SPIE, vol. 3980, pp. 85-96 (Feb. 2000).

Garrigues et al., "Atom position coding in a matching pursuit based video coder," Lecture Notes in Computer Science, 4 pp. (Sep. 2005).

Gavrilescu et al., "Embedded Multiple Description Scalar Quantizers," IEE Electronics Letters, vol. 39, No. 13, 12 pp. (Jun. 2003).

Gish et al., "Asymptotically efficient quantizing," IEEE Trans. Inform. Theory, vol. IT-14, No. 5 (Sep. 1968).

Golston et al., "Video codecs tutorial: Trade-offs with H.264, VC-1 and other advanced codecs," Video/Imaging Design Line, 9 pp. (Mar. 2006).

"H.264 & IPTV Over DSL—Enabling New Telco Revenue Opportunities," White Paper, 12 pp. (May 15, 2004).

Hannuksela et al., "Sub-picture: ROI coding and unequal error protection," Proc. 2002 Int'l Conf. on Image Processing, vol. 3, Issue 24-28, pp. 537-540 (Jun. 2002).

"ISO/IEC 11172-2 Coding of moving pictures and associated audio for digital storage media at up to about 1.5 Mbit/s," MPEG (Moving Pictures Expert Group), International Organization for Standardization, MPEG1 Video, 122 pp. (Aug. 1993).

"ISO/IEC 13818-2. Generic coding of moving pictures and associated audio information," MPEG (Moving Pictures Expert Group), International Organization for Standardization, MPEG2 Video, 23 pp. (Dec. 2000).

ISO/IEC, "14496-2: Information Technology—Coding of Audio-Visual Objects—Part 2: Visual," 724 pp. (Jun. 2004).

ITU-T, "ITU-T Recommendation 14.261: Video Codec for Audiovisual Services at $p \times 64$ kbits," 28 pp. (Mar. 1993).

ITU-T, "ITU-T Recommendation 11.262: Information Technology—Generic Coding of Moving Pictures and Associated Audio Information: Video," 218 pp. (Jul. 1995).

ITU-T, "ITU-T Recommendation H.263: Video Coding for Low Bit Rate Communication," 167 pp. (Feb. 1998).

Joint Video Team (JVT) of ISO/IEC MPEG & ITU-T VCEG, "Draft ITU-T Recommendation and Final Draft International Standard of Joint Video Specification (ITU-T Rec. H.264 ISO/IEC 14496-10 AVC," 253 pp. (May 2003).

Joshi et al., "Comparison of generalized Gaussian and Laplacian modeling in DCT image coding," IEEE Signal Proc. Letters, vol. SPL-2, No. 5, pp. 81-82 (May 1995).

Kim et al., "Still image coding based on vector quantization and fractal approximation," IEEE Transactions on Image Processing, vol. 5, No. 4, pp. 587-597 (Apr. 1996).

Kopp, "Lossless Wavelet Based Image Compression with Adaptive 2D Decomposition," Proc. 4th Int'l Conf. in Central Europe on Computer Graphics and Visualization 96, pp. 141-149 (Feb. 12-16, 1996).

Lam et al., "A mathematical analysis of the DCT coefficient distributions for images," IEEE Trans. Image Proc., vol. IP-9, No. 10, pp. 1661-1666 (Oct. 2000).

LeGall, "MPEG: A Video Compression Standard for Multimedia Application," Communications of the ACM, vol. 34, No. 4, pp. 47-58 (Apr. 1991).

LeGall, "The MPEG Video Compression Algorithm," Signal Processing: Image Communication 4, vol. 4, No. 2, pp. 129-140 (Apr. 1992).

LeGall et al., "Transmission of HDTV signals under 140 Mbit/s using a subband decomposition and Discrete Cosine Transform coding," in Signal Processing of HDTV, Elsevier, Amsterdam, pp. 287-293 (Oct. 1988).

Limb, "A Picture-Coding Algorithm for the Merli Scan," IEEE Transactions on Communications, pp. 300-305 (Apr. 1973).

Lin et al., "Low-complexity face-assisted coding scheme for low bit rate video telephony," *IEICE Trans. Inf. & Sys.*, vol. E86-D, No. 1, pp. 101-108 (Jan. 2003).

Lin et al., "Low-complexity face-assisted video coding," *Proc. 2000 Int'l Conf. on Image Processing*, vol. 2, pp. 207-210 (Sep. 2000).

Lloyd, "Least squares quantization in PCM," *IEEE Trans. Inform. Theory*, vol. IT-28, No. 2, pp. 7-12 (Mar. 1982) (reprint of work originally presented in Jul. 1957).

Loomis, "Using the Advanced Settings of the Windows Media Video 9 Advanced Profile Codec," 13 pp. (Document dated Apr. 2006) [Downloaded from the World Wide Web on May 31, 2007].

Lopresto et al., "Image Coding Based on Mixture Modeling of Wavelet Coefficients and a Fast Estimation-Quantization Framework," *Proc. IEEE Data Compression Conference*, (Snowbird, UT), pp. 221-230 (Mar. 1997).

Luo et al., "A Scene Adaptive and Signal Adaptive Quantization for Subband Image and Video Compression Using Wavelets," *IEEE Trans. on Circuits and Systems for Video Tech.*, vol. 7, No. 2, pp. 343-357 (Apr. 1997).

Mallat, "A theory for multiresolution signal decomposition: the wavelet representation," *IEEE Trans. Pattern Anal. and Machine Intell.*, vol. PAMI-11, No. 7, pp. 674-692 (Jul. 1989).

Masala et al., "Perceptually Optimized MPEG Compression of Synthetic Video Sequences," *Proc. ICIP*, pp. 1-601-1-604 (Sep. 2005).

Max, "Quantizing for minimum distortion," *IEEE Trans. Inform. Theory*, vol. IT-6, No. 1, pp. 7-12 (Mar. 1960).

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Mitra et al., "Two-Stage Color Palettization for Error Diffusion," *Proceedings of SPIE*, pp. 207-217 (Jun. 2002).

Mook, "Next-Gen Windows Media Player Leaks to the Web," *BetaNews*, 17 pp. (Jul. 19, 2002) [Downloaded from the World Wide Web on Aug. 8, 2003].

Muller, "Distribution shape of two-dimensional DCT coefficients of natural images," *IEE Electronics Letters*, vol. 29, No. 22 (Oct. 1993).

Murakami et al., "Comparison between DPCM and Hadamard transform coding in the composite coding of the NTSC color TV signal," *IEEE Trans. on Commun.*, vol. COM-30, No. 3, pp. 469-479 (Mar. 1982).

Musmann et al., "Advances in Picture Coding," *Proceedings of the IEEE*, vol. 73, No. 4, pp. 523-548 (Apr. 1985).

Neff et al., "Modulus Quantization for Matching Pursuit Video Coding," IEEE Transactions on Circuits and Systems for Video Technology, vol. 10, No. 6, pp. 895-912 (Sep. 2000).

Nguyen et al., "Set Theoretic Compression with an Application to Image Coding," *IEEE Transactions on Image Processing*, vol. 7, No. 7, pp. 1051-1056 (Jul. 1998).

Park et al., "A post processing method for reducing quantization effects in low bit-rate moving picture coding," *IEEE Trans. Circuits Syst. Video Technology*, vol. 9, pp. 161-171 (Feb. 1999).

Puri et al., "Motion-Compensated Video Coding with Adaptive Perceptual Quantization," *IEEE Transactions on Circuits and Systems for Video Technology*, vol. 1, No. 4, pp. 351-361 (Dec. 1991).

Radha et al., "The MPEG-4 Fine-Grained Scalable Video Coding Method for Multimedia Streaming Over IP," *IEEE Trans. on Multimedia*, vol. 3, No. 1, pp. 53-68 (Mar. 2001).

Reininger et al., "Distribution of two-dimensional DCT coefficients for images," *IEEE Trans. on Commun.*, vol. COM-31, No. 6, pp. 835-839 (Jun. 1983).

Ribas Corbera et al., "Rate Control in DCT Video Coding for Low-Delay Communications," *IEEE Transactions on Circuits and Systems for Video Technology*, vol. 9, No. 1, pp. 172-185 (Feb. 1999).

Schuster et al., "A Theory for the Optimal Bit Allocation Between Displacement Vector Field and Displaced Frame Difference," *IEEE J. on Selected Areas in Comm.*, vol. 15, No. 9, pp. 1739-1751 (Dec. 1997).

Shanableh et al., "Heterogeneous Video Transcoding to Lower Spatio-Temporal Resolutions and Different Encoding Formats," *IEEE Transactions on Multimedia*, vol. 2, No. 2, pp. 101-110 (Jun. 2000).

Shen et al., "Rate-Distortion Optimization for Fast Hierarchical B-Picture Transcoding," *IEEE*, pp. 5279-5282 (May 2006).

Shoushun et al., "Adaptive-Quantization Digital Image Sensor for Low-Power Image Compression," in *IEEE Transactions on Circuits and Systems—I: Regular Papers*, vol. 54, No. 1, pp. 13-25 (Jan. 2007).

Sony Electronics Inc., "Sony Vizaro DVD Encoder System DVA-V700," 4 pp. (Apr. 2001).

Sullivan, "Efficient scalar quantization of exponential and Laplacian random variables," *IEEE Trans. Inform. Theory*, vol. IT-42, No. 5, pp. 1365-1374 (Sep. 1996).

Sullivan et al., "Rate-Distortion Optimization for Video Compression," *IEEE Signal Processing Magazine*, pp. 74-90 (Nov. 1998).

Sullivan et al., "The H.264/AVC Advanced Video Coding Standard: Overview and Introduction to the Fidelity Range Extensions," 21 pp. (Aug. 2004).

Tao et al., "Adaptive Model-driven Bit Allocation for MPEG Video Coding," *IEEE Transactions on Circuits and Systems for Video Tech.*, vol. 10, No. 1, pp. 147-157 (Feb. 2000).

Tsang et al., "Fuzzy Based Rate Control for Real-Time MPEG Video," *IEEE Transactions on Fuzzy Systems*, pp. 504-516 (Nov. 1998).

Wang, et al., "A Framework for Adaptive Scalable Video Coding Using Wyner-Ziv Techniques," *EURASIP Journal on Applied Signal Processing*, pp. 1-18 (month unknown, 2006).

Watson et al., "Visibility of Wavelet Quantization Noise," *IEEE Trans. on Image Processing*, vol. 6, No. 8, pp. 1164-1175 (Aug. 1997).

Wien, "Variable Block-Size Transforms for Hybrid Video Coding," Dissertation, 182 pp. (Feb. 2004).

Wu et al., "Context-Based, Adaptive, Lossless Image Coding," *IEEE Trans. Communications*, vol. 45, pp. 437-444 (Apr. 1997).

Wu et al., "Joint Estimation of Forward and Backward Motion Vectors for Interpolative Prediction of Video," *IEEE Transactions on Image Processing*, vol. 3, No. 5, pp. 684-687 (Sep. 1994).

Xiong et al., "Wavelet Packet Image Coding Using Space-Frequency Quantization," *IEEE Transactions on Image Processing*, vol. 7, No. 6, pp. 892-898 (Jun. 1998).

Yang et al., "Rate Control for Videophone Using Local Perceptual Cues," *IEEE Transactions on Circuits and Systems for Video Tech.*, vol. 15, No. 4, pp. 496-507 (Apr. 2005).

Yuen et al., "A survey of hybrid MC/DPCM/DCT video coding distortions," *Signal Processing*, vol. 70, pp. 247-278 (Nov. 1998).

Zaid et al., "Wavelet Image Coding with Adaptive Thresholding," 4 pp. (Jul. 2002).

Zhang et al., "Adaptive Field/Frame Selection for High Compression Coding," *SPIE Conf on Image and Video Communications and Processing*, 13 pp. (Jan. 2003).

U.S. Appl. No. 11/728,895, filed Mar. 26, 2007, Holcomb et al.

Golner et al., "Region Based Variable Quantization for JPEG Image Compression," *IEEE Symp. on Circuits and Systems*, pp. 604-607 (Aug. 2000).

Lei et al., "Rate Adaptation Transcoding for Precoded Video Streams," 13 pp. (2000).

Schallauer et al., "PRESTO—Preservation Technologies for European Broadcast Archives, D5.4—High Quality Compression for Film and Video," 80 pp. (Sep. 18, 2002).

Chai et al., "Face Segmentation Using Skin-Color Map in Videophone Applications," IEEE Transaction on Circuits and Systems for Video Technology, vol. 9, No. 4, pp. 551-564, Jun. 1999.

Correia et al., "Classification of Video Segmentation Application Scenarios," IEEE Transactions on Circuits and Systems for Video Technology, vol. 14, No. 5, pp. 735-741, May 2004.

Daly et al., "Face-Based Visually-Optimized Image Sequence Coding," 1998 International Conference on Image Processing, vol. 3, pp. 443-447, Oct. 1998.

\* cited by examiner

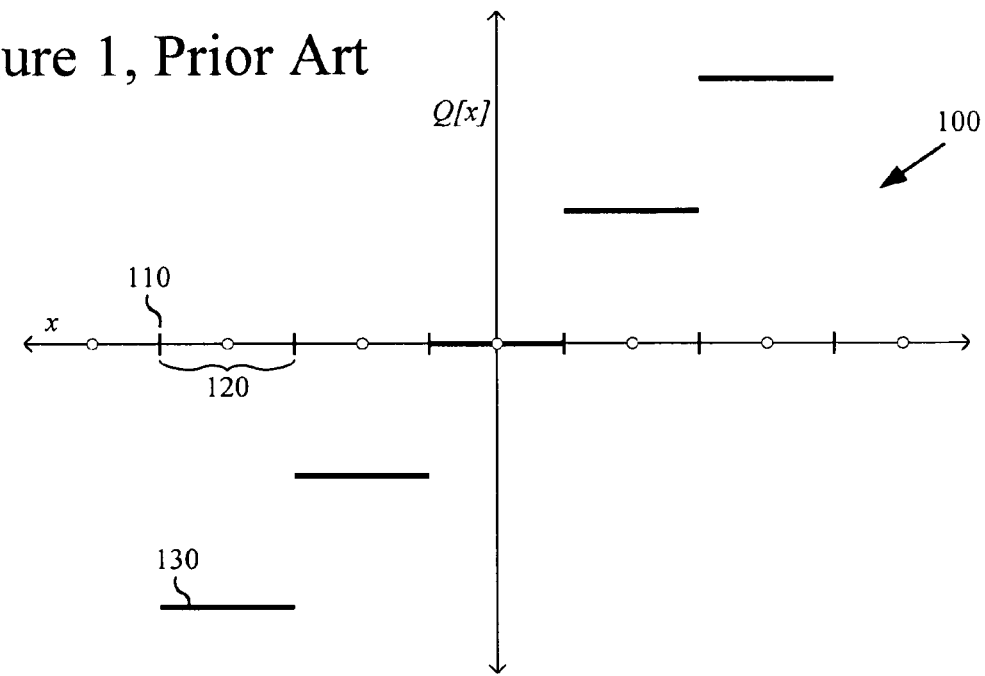
Figure 1, Prior Art
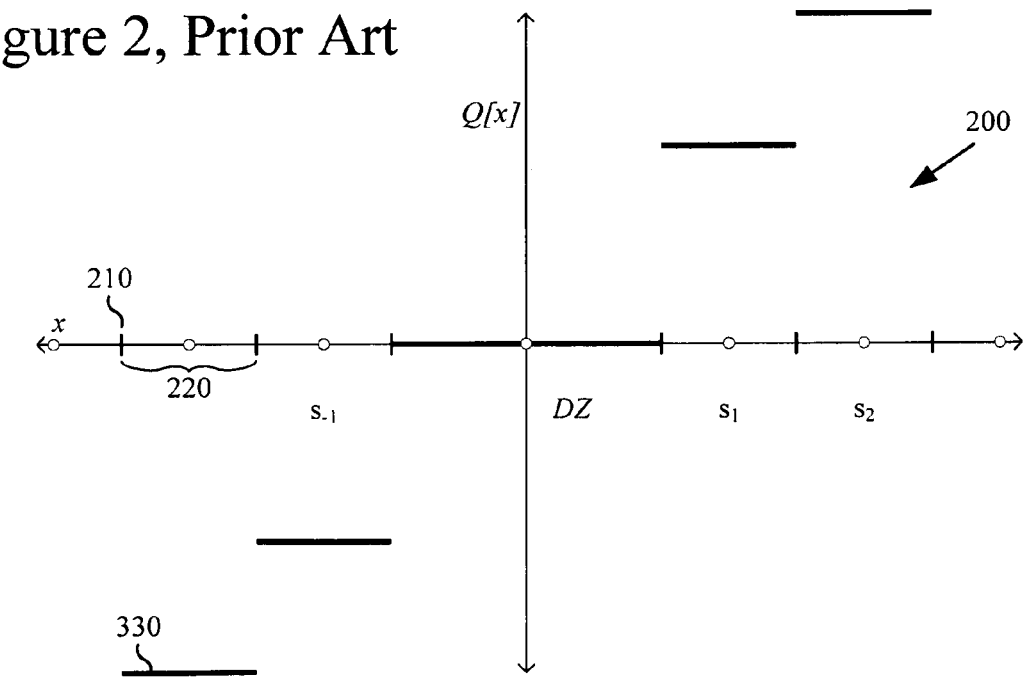
Figure 2, Prior Art

Software 380 implementing encoder or other tool that controls encoding quality for textured, dark smooth and other smooth video content

Figure 9
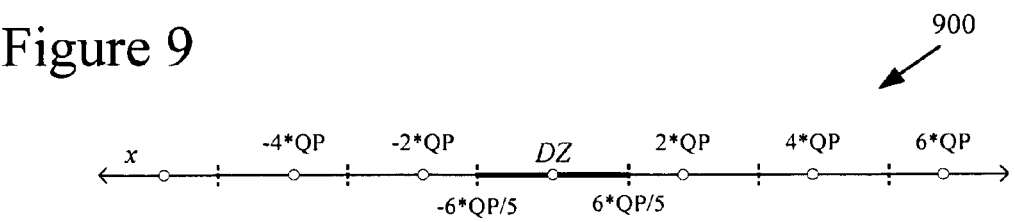
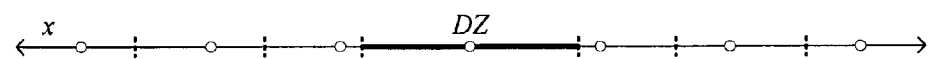
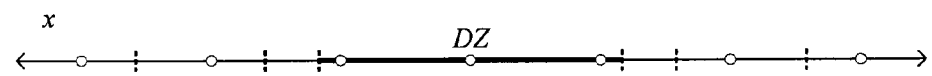
Figure 10
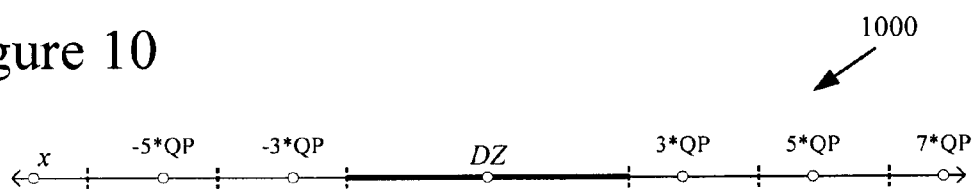
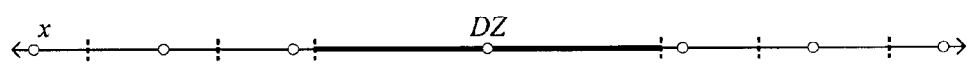
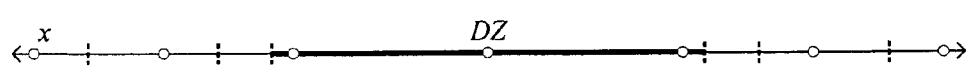

Figure 11
| | | | | | | | |
|---|---|---|---|---|---|---|---|
| 296 | -867 | 202 | 13 | 0 | 0 | 1 | 0 |
| 311 | 197 | 105 | 8 | 0 | 0 | -3 | 0 |
| -241 | 188 | 3 | -5 | 0 | -1 | 0 | 1 |
| 14 | 3 | 0 | 0 | 0 | 0 | 0 | 0 |
| 5 | 0 | 0 | -1 | 0 | 0 | -2 | 0 |
| 0 | 0 | 0 | 0 | 0 | 0 | 0 | 0 |
| 0 | 0 | 0 | 2 | 0 | 0 | 0 | 0 |
| -2 | 0 | -1 | 0 | 0 | 0 | -15 | 41 |
1100
Figure 12A
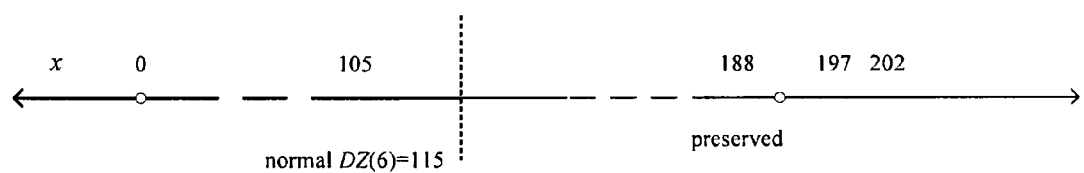
1200
Figure 12B
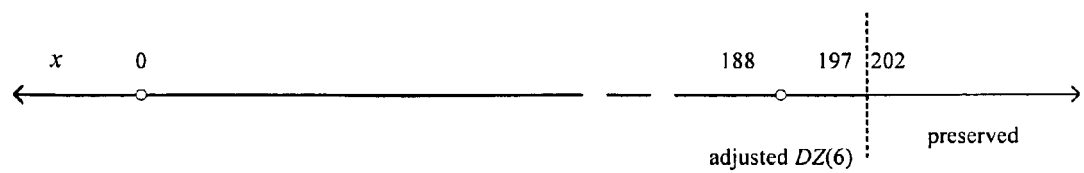
1250

CLASSIFYING AND CONTROLLING ENCODING QUALITY FOR TEXTURED, DARK SMOOTH AND SMOOTH VIDEO CONTENT

BACKGROUND

Engineers use compression (also called coding or encoding) to reduce the bit rate of digital video. Compression decreases the cost of storing and transmitting video by converting the video into a lower bit rate form. Decompression (also called decoding) reconstructs a version of the original video from the compressed form. A "codec" is an encoder/decoder system.

Intra-picture Compression and Inter-picture Compression

In general, video compression techniques include "intra-picture" compression and "inter-picture" compression. Intra-picture compression techniques compress an individual picture without reference to other pictures that have been compressed and reconstructed. Inter-picture compression techniques compress a picture with reference to preceding and/or following picture(s) (often called reference or anchor pictures) that have already been compressed and reconstructed.

Most encoders use a frequency transform during intra-picture compression and inter-picture compression. For example, the encoder splits a picture into non-overlapping blocks of samples and applies a forward frequency transform to individual blocks. The frequency transform maps the sample values of a block to transform coefficients, which are coefficients of basis functions that correspond to frequency components. In particular, the lowest frequency coefficient—called the DC coefficient—indicates the average sample value for the block. The other coefficients—called AC coefficients—indicate patterns of changes in sample values of the block, from gradual low-frequency variations across the block to sharper high-frequency variations within the block. In many encoding scenarios, a relatively small number of frequency coefficients (e.g., the DC coefficient and lower frequency AC coefficients) capture much of the energy or signal content in the block. The encoder quantizes the transform coefficients, resulting in a block of quantized transform coefficients. The encoder further encodes the quantized transform coefficients, for example, using entropy coding, and outputs a bitstream of compressed video information.

In corresponding decoding, a decoder reads the bitstream of compressed video information and performs operations to reconstruct the pictures that were encoded. When the encoding uses lossy compression (e.g., in quantization), the reconstructed pictures approximate the source pictures that were encoded but are not exactly the same. For example, to reconstruct a version of the original 8×8 block of an intra-compressed picture, the decoder reconstructs quantized transform coefficients using entropy decoding. The decoder inverse quantizes the quantized transform coefficients of the block and applies an inverse frequency transform to the de-quantized transform coefficients, producing the reconstructed version of the original 8×8 block.

Inter-picture compression techniques often use motion compensation to reduce bit rate by exploiting temporal redundancy in video. In general, motion compensation is a process of producing predictions from reference picture(s) (such as previously encoded/decoded picture(s)) using motion data. An encoder and decoder store previously coded/decoded pictures in a picture store. The reference pictures in the picture store can then provide motion-compensated predictor blocks for the blocks of a current picture being encoded. Often, the encoder does not find a perfect match. For this reason, the encoder computes the sample-by-sample differences between the current block and its motion-compensated prediction to determine a residual (also called error signal). The residual is frequency transformed, quantized, and entropy encoded. When reconstructing residuals, a decoder (and also the encoder) reconstructs transform coefficients that were quantized and performs an inverse frequency transform. The decoder/encoder performs motion compensation to compute motion-compensated predictors, and combines the predictors with the residuals.

Types of Quantization

According to one possible definition, quantization is a term used for an approximating non-reversible mapping function commonly used for lossy compression, in which there is a specified set of possible output values, and each member of the set of possible output values has an associated set of input values that result in the selection of that particular output value. A variety of quantization techniques have been developed, including scalar or vector, uniform or non-uniform, and adaptive or non-adaptive quantization.

According to one possible definition, a scalar quantizer is an approximating functional mapping $x \rightarrow Q[x]$ of an input value x to a quantized value $Q[x]$, sometimes called a reconstructed value. FIG. 1 shows a "staircase" I/O function (100) for a scalar quantizer, along with example reconstruction points for inverse quantization. The horizontal axis is a number line for an input variable x, and the vertical axis indicates the corresponding quantized values $Q[x]$. The number line is partitioned by thresholds such as the threshold (110). Each value of x within a given range between a pair of adjacent thresholds is assigned the same quantized value $Q[x]$. For example, each value of x within the range (120) is assigned the same quantized value (130). (At a threshold, one of the two possible quantized values is assigned to an input x, depending on the system.) Overall, the quantized values $Q[x]$ exhibit a discontinuous, staircase pattern. The placement of the thresholds on the number line may be uniformly spaced (as shown in FIG. 1) or non-uniformly spaced.

A scalar quantizer can be decomposed into two distinct stages. The first stage is the classifier stage, in which a classifier function mapping $x \rightarrow A[x]$ maps an input x to a quantization index $A[x]$, which is often integer-valued. In essence, the classifier segments an input number line or data set, as in FIG. 1, by thresholds such as the threshold (110).

In the second stage, a reconstructor functional mapping $k \rightarrow \beta[k]$ maps each quantization index k to a reconstruction value $\beta[k]$. In essence, the reconstructor selects a value for reconstruction of each region determined by the classifier. The reconstructor functional mapping may be implemented, for example, using a lookup table. FIG. 1 shows (as open circles) example reconstruction points according to a midpoint reconstruction rule. Overall, the classifier relates to the reconstructor as follows:

$$Q[x] = \beta[A[x]] \qquad (1).$$

In common usage, the term "quantization" is often used to describe the classifier stage, which is performed during encoding. The term "inverse quantization" is similarly used to describe the reconstructor stage, whether performed during encoding or decoding.

A non-uniform quantizer has threshold values that are not uniformly spaced for all classifier regions. According to one possible definition, a dead zone plus uniform threshold quantizer ("DZ+UTQ") is a quantizer with uniformly spaced threshold values for all classifier regions except the one containing the zero input value (which is called the dead zone ("DZ")). In a general sense, a DZ+UTQ is a non-uniform quantizer, since the DZ size is different than the other classifier regions.

FIG. 2 shows a staircase I/O function (200) for a DZ+UTQ, in which the DZ is wider than the other steps s. The number line is partitioned by thresholds such as the threshold (210), and each value of x within a given range between a pair of adjacent thresholds is assigned the same quantized value Q[x]. For example, each value of x within the range (220) is assigned the same quantized value (230). In FIG. 2, the DZ is twice as wide as the other classification zones. FIG. 2 shows (as open circles) example reconstruction points according to a midpoint reconstruction rule.

Adjusting Quantization

Quantization can affect the fidelity with which transform coefficients are encoded, which in turn can affect bit rate. Coarser quantization tends to decrease fidelity to the original transform coefficients (and produce more distortion) as the coefficients are more coarsely approximated. Bit rate also decreases, however, when decreased complexity can be exploited with lossless compression (e.g., entropy encoding). Conversely, finer quantization tends to preserve fidelity and quality (and produce less distortion) but result in higher bit rates.

Some encoders adjust quantization between pictures and/or within pictures to control where distortion is introduced. For a given bit rate/quality level, this allows an encoder to introduce more distortion where it will be less visible and/or avoid introducing distortion where it would be more visible. The allocation of available bits among pictures and within pictures plays an important role in how distortion is introduced and how the user perceives the quality of the video.

Different encoders typically apply different quantization rules, but there are some common principles. Quantization can produce visible artifacts that tend to be more artificial-looking and visually distracting than simple loss of fine detail. For example, the human visual system is more sensitive to distortion in relatively smooth content than to distortion in textured content. High texture levels tend to mask quality degradation and quantization artifacts. On the other hand, in regions with lower texture levels, distortion tends to be more visible. So, in smooth regions distortion may create a visible line, step or other flaw in the reconstructed image, while the same amount of distortion may not create noticeable flaws in textured areas due to masking effects of surrounding detail.

Thus, a common strategy is to allocate relatively more bits to smooth content and relatively fewer bits to textured content, so that less distortion is introduced in smooth content at the expense of more distortion in the textured content (where the distortion is not as perceptually noticeable). To identify textured content and non-textured content, various texture metrics and texture thresholds have been used. In some cases, an encoder varies quantization depending on texture. This allows the encoder to coarsen quantization when doing so will not dramatically increase perceptibility of the distortion and use finer quantization in other situations.

Standards and product specifications that focus only on achieving interoperability will often specify reconstruction values for inverse quantization without specifying a classification rule for quantization. In other words, some specifications may define the functional mapping k→β[k] for reconstruction without defining the functional mapping x→A[x] for classification. This allows a decoder built to comply with the standard/product to reconstruct information correctly. In contrast, encoders are often given the freedom to change the classifier. For classification, the thresholds can be defined so that certain input values will be mapped to more common (and hence, lower bit rate) indices, which makes the reconstruction values closer to optimal for some content. This also allows the encoder to adjust to expected distributions in values. For example, an encoder may define the DZ threshold to be wider or narrower for a quantizer. Or, more generally, the encoder may define other thresholds according to which values are quantized so as to quantize values more aggressively.

The preceding adaptive quantization mechanisms help improve performance in many scenarios. In some scenarios, however, they fail to provide quantization control that is both usable and sufficiently fine-grained. For example, in some scenarios, previous adaptive quantization mechanisms provide insufficient control over how content is classified as textured or non-textured. As a result, encoding of smooth areas introduces an unacceptable amount of distortion. Another problem is that, in some scenarios, previous adaptive quantization mechanisms provide insufficient control over bit allocation for different types of non-textured content. Given the critical importance of video compression to digital video, it is not surprising that video compression is a richly developed field. Whatever the benefits of previous video compression techniques, however, they do not have the advantages of the following techniques and tools.

SUMMARY

In summary, the present application is directed to techniques and tools for content classification and adaptive quantization. In some embodiments, a video encoder classifies blocks of video pictures as textured, dark smooth or smooth and adjusts quantization of the blocks depending on the classifications. This helps the encoder control how distortion is introduced in textured regions, dark smooth regions, and other smooth regions, improving overall perceived quality.

According to a first aspect of the techniques and tools, a tool such as an encoder classifies units such as blocks of a picture. For each of multiple units of a picture, the tool assigns a classification to the unit based at least in part on the results of analyzing the content of the unit. The tool then uses the classifications to process the units. The classification for at least one of the units is a first classification type, and the classification for at least one of the plural units is a second classification type indicating darker content than the first classification type. In an example implementation, a video encoder classifies a block as textured or non-textured by comparing the energy of AC coefficients for the block to a texture threshold. If the block is not textured, the video encoder further classifies the block as dark smooth or smooth depending on average intensity value for the block. Using the block classifications and one or more control parameters to control bit allocation for dark smooth content relative to other smooth content, the encoder encodes the blocks and outputs encoded video information.

According to a second aspect of the techniques and tools, an encoding tool encodes units such as blocks of video pictures. The encoding tool sets one or more parameters to control bit allocation for a first classification type relative to a second classification type during encoding, where the second classification type indicates darker content than the first classification type. The parameter(s) can include one or more target AC coefficient counts for the first classification type and one or more target AC coefficient counts for the second classification type. To set the parameter(s), the tool encodes (in a first encoding pass) the units using initial values for the parameter(s) then adjusts the values of the parameter(s) based at least in part upon results of the first pass encoding with the initial values. For example, the tool changes the initial values depending upon target bit rate and resulting bit rate of the first pass encoding. The tool then encodes (in a second encoding pass) the units using the adjusted values and outputs the encoded units in a bit stream. The first pass encoding and second pass encoding can include classification of the blocks as textured, dark smooth and other smooth, and can use an adaptive, user-adjustable texture threshold.

According to third aspect of the techniques and tools, an encoding tool includes a user interface module, an encoding control module, and one or more video encoding modules. The user interface module is adapted to receive user input that indicates a level of texture classification. The encoding control module is adapted to set a texture threshold based at least in part upon the level of texture classification, using a non-linear mapping of possible values of level of texture classification to the possible values of the texture threshold. The non-linear mapping can embody finer gradations for simpler content (such as animation content) and coarser gradations for more complex content (such as natural video), so as to improve control over textured/non-textured threshold decisions. The video encoding module(s) can include a module adapted to set parameters to control bit allocation between textured content, dark smooth content, and other smooth content during the encoding.

The foregoing and other objects, features, and advantages of the invention will become more apparent from the following detailed description, which proceeds with reference to the accompanying figures.

BRIEF DESCRIPTION OF THE DRAWINGS

FIGS. 1 and 2 are charts illustrating aspects of quantization according to the prior art.

FIGS. 9 and 10 are charts illustrating aspects of quantization in some embodiments.

FIG. 11 is a chart illustrating an example block of transform coefficients, and FIGS. 12A and 12B are charts illustrating example quantization decisions for the transform coefficients shown in FIG. 11.

DETAILED DESCRIPTION

Figure 3:
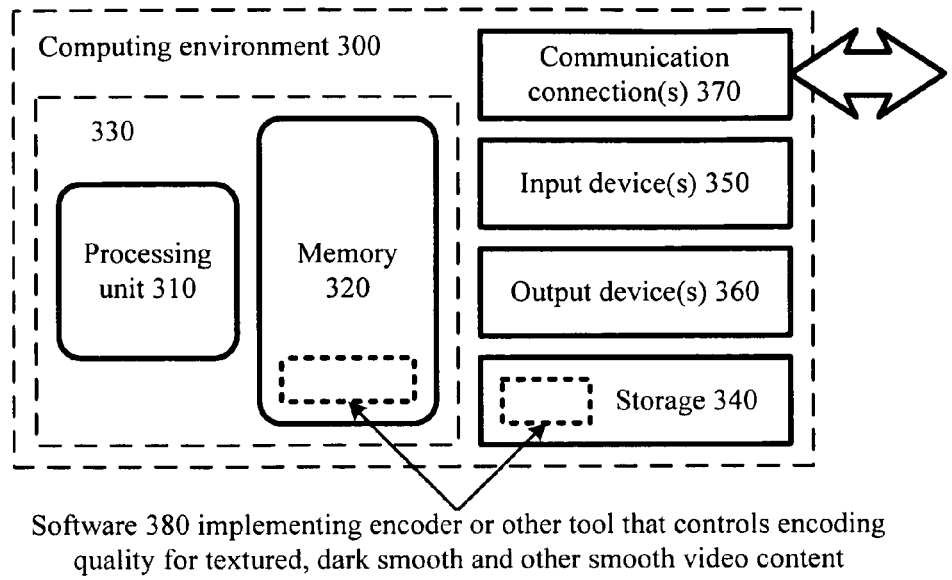
FIG. 3 is a block diagram of a suitable computing environment in which several described embodiments may be implemented.

The present application relates to techniques and tools for improving quantization by controlling encoding quality of dark smooth video content relative to other smooth video content and textured video content. Certain types of quantization artifacts are particularly noticeable in dark areas that lack texture detail. By allocating relatively more bits to dark smooth areas, overall perceived quality can be improved.

In some embodiments, an encoding tool classifies blocks of video as smooth, dark smooth or textured. The encoding tool allocates bits to blocks in the three different categories. For example, the encoding tool changes macroblock quantization step sizes and/or quantizer DZ size depending on block classifications. Then, when the encoding tool introduces distortion to regulate bit rate, it tends to introduce more distortion where it is expected to be less perceptible (e.g., textured areas) and introduce less distortion where it would likely be more perceptible (e.g., dark smooth areas), thereby helping to achieve a desired perceptual quality within a given bit rate constraint.

In some embodiments, the encoding tool uses a rate control mechanism to help achieve the desired allocations during encoding. The encoding tool can use a two-pass encoding process to help achieve the desired perceptual quality of compressed video via allocation of bits between smooth, dark smooth, and textured content. In the first pass, the encoding tool encodes the video using initial settings for control parameters. The encoding tool then analyzes results of the first encoding pass, so as to determine the desired settings for the control parameters for encoding in a second pass. In the second pass, the encoding tool encodes the video using the desired settings for the control parameters.

Various alternatives to the implementations described herein are possible. Certain techniques described with reference to flowchart diagrams can be altered by changing the ordering of stages shown in the flowcharts, by repeating or omitting certain stages, etc. For example, initial stages of classification (e.g., obtaining frequency coefficients for a picture, macroblock(s) or block(s)) can be completed before later stages begin, or operations for the different stages can be interleaved on a block-by-block, macroblock-by-macroblock, or other region-by-region basis.

The various techniques and tools described herein can be used in combination or independently. Different embodiments implement one or more of the described techniques and tools. Aside from uses in video compression, the adaptive quantization techniques and tools can be used in image compression, other compression, or other areas. While many examples described herein involve quantization of AC coefficients for blocks by a video encoder, alternatively the techniques and tools described herein are applied to quantization of AC coefficients for blocks in an image encoder.

Some of the techniques and tools described herein address one or more of the problems noted in the background. Typically, a given technique/tool does not solve all such problems. Rather, in view of constraints and tradeoffs in encoding time, resources, and/or quality, the given technique/tool improves encoding performance for a particular implementation or scenario.

I. Computing Environment.

FIG. 3 illustrates a generalized example of a suitable computing environment (300) in which several of the described embodiments may be implemented. The computing environment (300) is not intended to suggest any limitation as to scope of use or functionality, as the techniques and tools may be implemented in diverse general-purpose or special-purpose computing environments.

With reference to FIG. 3, the computing environment (300) includes at least one processing unit (310) and memory (320). In FIG. 3, this most basic configuration (330) is included within a dashed line. The processing unit (310) executes computer-executable instructions and may be a real or a virtual processor. In a multi-processing system, multiple processing units execute computer-executable instructions to increase processing power. The memory (320) may be volatile memory (e.g., registers, cache, RAM), non-volatile memory (e.g., ROM, EEPROM, flash memory, etc.), or some combination of the two. The memory (320) stores software (380) implementing an encoding tool that implements one or more of the described techniques for controlling encoding quality for textured, dark smooth and other smooth video content.

A computing environment may have additional features. For example, the computing environment (300) includes storage (340), one or more input devices (350), one or more output devices (360), and one or more communication connections (370). An interconnection mechanism (not shown) such as a bus, controller, or network interconnects the components of the computing environment (300). Typically, operating system software (not shown) provides an operating environment for other software executing in the computing environment (300), and coordinates activities of the components of the computing environment (300).

The storage (340) may be removable or non-removable, and includes magnetic disks, magnetic tapes or cassettes, CD-ROMs, DVDs, or any other medium which can be used to store information and which can be accessed within the computing environment (300). The storage (340) stores instructions for the software (380) implementing the encoding tool.

The input device(s) (350) may be a touch input device such as a keyboard, mouse, pen, or trackball, a voice input device, a scanning device, or another device that provides input to the computing environment (300). For audio or video encoding, the input device(s) (350) may be a sound card, video card, TV tuner card, or similar device that accepts audio or video input in analog or digital form, or a CD-ROM or CD-RW that reads audio or video samples into the computing environment (300). The output device(s) (360) may be a display, printer, speaker, CD-writer, or another device that provides output from the computing environment (300).

The communication connection(s) (370) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (300), computer-readable media include memory (320), storage (340), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "classify" and "set" to describe computer operations in a computing environment. These terms are high-level abstractions for operations performed by a computer, and should not be confused with acts performed by a human being. The actual computer operations corresponding to these terms vary depending on implementation.

II. Generalized Video Encoder.

Figure 4:
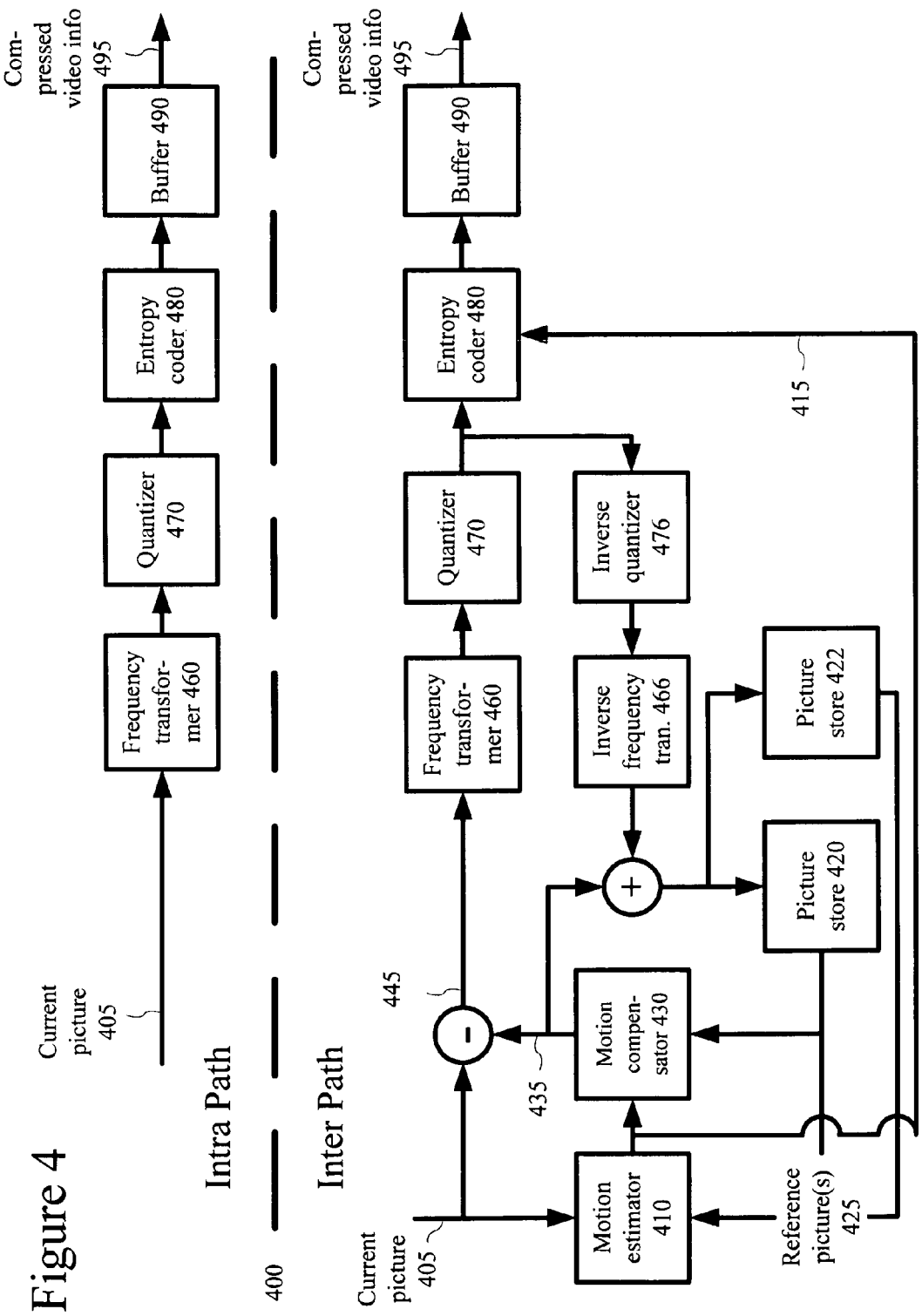
FIG. 4 is a block diagram of a video encoder system in conjunction with which several described embodiments may be implemented.

FIG. 4 is a block diagram of a generalized video encoder (400) in conjunction with which some described embodiments may be implemented. The encoder (400) receives a sequence of video pictures including a current picture (405) and produces compressed video information (495) as output to storage, a buffer, or a communications connection. The format of the output bitstream can be a Windows Media Video or SMPTE 421M format, MPEG-x format (e.g., MPEG-1, MPEG-2, or MPEG-4), H.26x format (e.g., H.261, H.262, H.263, or H.264), or other format.

The encoder (400) processes video pictures. The term picture generally refers to source, coded or reconstructed image data. For progressive video, a picture is a progressive video frame. For interlaced video, a picture may refer to an interlaced video frame, the top field of the frame, or the bottom field of the frame, depending on the context. The encoder (400) is block-based and uses a 4:2:0 macroblock format for frames, with each macroblock including four 8×8 luma blocks (at times treated as one 16×16 macroblock) and two 8×8 chroma blocks. For fields, the same or a different macroblock organization and format may be used. The 8×8 blocks may be further sub-divided at different stages, e.g., at the frequency transform and entropy encoding stages. The encoder (400) can perform operations on sets of samples of different size or configuration than 8×8 blocks and 16×16 macroblocks. Alternatively, the encoder (400) is object-based or uses a different macroblock or block format.

Returning to FIG. 4, the encoder system (400) compresses predicted pictures and intra-coded, key pictures. For the sake of presentation, FIG. 4 shows a path for key pictures through the encoder system (400) and a path for predicted pictures. Many of the components of the encoder system (400) are used for compressing both key pictures and predicted pictures. The exact operations performed by those components can vary depending on the type of information being compressed.

A predicted picture (e.g., progressive P-frame or B-frame, interlaced P-field or B-field, or interlaced P-frame or B-frame) is represented in terms of prediction from one or more other pictures (which are typically referred to as reference pictures or anchors). A prediction residual is the difference between predicted information and corresponding original information. In contrast, a key picture (e.g., progressive I-frame, interlaced I-field, or interlaced I-frame) is compressed without reference to other pictures.

If the current picture (405) is a predicted picture, a motion estimator (410) estimates motion of macroblocks or other sets of samples of the current picture (405) with respect to one or more reference pictures. The picture store (420) buffers a reconstructed previous picture (425) for use as a reference picture. When multiple reference pictures are used, the multiple reference pictures can be from different temporal directions or the same temporal direction. The motion estimator (410) outputs as side information motion information (415) such as differential motion vector information.

The motion compensator (430) applies reconstructed motion vectors to the reconstructed (reference) picture(s)

(425) when forming a motion-compensated current picture (435). The difference (if any) between a block of the motion-compensated current picture (435) and corresponding block of the original current picture (405) is the prediction residual (445) for the block. During later reconstruction of the current picture, reconstructed prediction residuals are added to the motion-compensated current picture (435) to obtain a reconstructed picture that is closer to the original current picture (405). In lossy compression, however, some information is still lost from the original current picture (405). Alternatively, a motion estimator and motion compensator apply another type of motion estimation/compensation.

A frequency transformer (460) converts spatial domain video information into frequency domain (i.e., spectral, transform) data. For block-based video pictures, the frequency transformer (460) applies a DCT, variant of DCT, or other forward block transform to blocks of the samples or prediction residual data, producing blocks of frequency transform coefficients. Alternatively, the frequency transformer (460) applies another conventional frequency transform such as a Fourier transform or uses wavelet or sub-band analysis. The frequency transformer (460) may apply an 8×8, 8×4, 4×8, 4×4 or other size frequency transform.

A quantizer (470) then quantizes the blocks of transform coefficients. The quantizer (470) applies non-uniform, scalar quantization to the spectral data with a step size that varies on a picture-by-picture basis or other basis. The quantizer (470) can also apply another type of quantization to the spectral data coefficients, for example, a uniform or adaptive quantization for at least some of the coefficients, or directly quantizes spatial domain data in an encoder system that does not use frequency transformations. In described embodiments, the quantizer (470) (in conjunction with other modules such as a rate controller) controls encoding quality for textured, dark smooth and other smooth video content by adjusting quantization step size and/or DZ size.

When a reconstructed current picture is needed for subsequent motion estimation/compensation, an inverse quantizer (476) performs inverse quantization on the quantized spectral data coefficients. An inverse frequency transformer (466) performs an inverse frequency transform, producing blocks of reconstructed prediction residuals (for a predicted picture) or samples (for a key picture). If the current picture (405) was a key picture, the reconstructed key picture is taken as the reconstructed current picture (not shown). If the current picture (405) was a predicted picture, the reconstructed prediction residuals are added to the motion-compensated predictors (435) to form the reconstructed current picture. One or both of the picture stores (420, 422) buffers the reconstructed current picture for use in subsequent motion-compensated prediction.

The entropy coder (480) compresses the output of the quantizer (470) as well as certain side information (e.g., motion information (415), quantization step size). Typical entropy coding techniques include arithmetic coding, differential coding, Huffman coding, run length coding, LZ coding, dictionary coding, and combinations of the above. The entropy coder (480) typically uses different coding techniques for different kinds of information, and can choose from among multiple code tables within a particular coding technique.

The entropy coder (480) provides compressed video information (495) to the multiplexer ("MUX") (490). The MUX (490) may include a buffer, and a buffer level indicator may be fed back to a controller. Before or after the MUX (490), the compressed video information (495) can be channel coded for transmission over the network.

A controller (not shown) receives inputs from various modules such as the motion estimator (410), frequency transformer (460), quantizer (470), inverse quantizer (476), entropy coder (480), and buffer (490). The controller evaluates intermediate results during encoding, for example, setting quantization step sizes and performing rate-distortion analysis. The controller works with modules such as the motion estimator (410), frequency transformer (460), quantizer (470), and entropy coder (480) to classify types of content, and to set and change coding parameters during encoding. When an encoder evaluates different coding parameter choices during encoding, the encoder may iteratively perform certain stages (e.g., quantization and inverse quantization) to evaluate different parameter settings. The encoder may set parameters at one stage before proceeding to the next stage. Or, the encoder may jointly evaluate different coding parameters. The tree of coding parameter decisions to be evaluated, and the timing of corresponding encoding, depends on implementation.

The relationships shown between modules within the encoder (400) indicate general flows of information in the encoder; other relationships are not shown for the sake of simplicity. In particular, FIG. 4 usually does not show side information indicating the encoder settings, modes, tables, etc. used for a video sequence, picture, macroblock, block, etc. Such side information, once finalized, is sent in the output bitstream, typically after entropy encoding of the side information.

Particular embodiments of video encoders use a variation or supplemented version of the generalized encoder (400). Depending on implementation and the type of compression desired, modules of the encoder can be added, omitted, split into multiple modules, combined with other modules, and/or replaced with like modules. For example, the controller can be split into multiple controller modules associated with different modules of the encoder. In alternative embodiments, encoders with different modules and/or other configurations of modules perform one or more of the described techniques.

III. Distinguishing Types of Picture Content

The human visual system perceives distortion differently in textured picture content, dark smooth picture content, and other smooth picture content. Generally, a given amount of distortion is more noticeable and distracting in non-textured content than textured content. Among non-textured content, a given amount of distortion is usually more noticeable and distracting in dark smooth content than other smooth content. Classifying picture content as textured, smooth or dark smooth facilitates allocation of available bits to the different categories of content, so as to control the perceptibility of distortion when distortion is introduced.

In some embodiments, a tool such as a video encoder classifies blocks of sample values in video pictures into three categories: smooth, dark smooth, and textured. The texture of a block generally corresponds to amount of detail in the block. It can also relate to the amount of energy in different frequency coefficients for the block. A block with complex, intricate detail has high texture, and higher frequency AC coefficients for the block usually represent much of the energy for the block. In contrast, a "smooth" block can include uniform or nearly uniform sample values or, more generally, content classified as non-textured according to a texture metric in use. Smooth regions can include flat regions (areas of constant or nearly constant color) or gradient slope regions (areas of color that vary at a constant or nearly constant rate across the region), and smooth regions may be considered smooth even when interrupted by small areas of noise, film grains, or other color variations. A "dark smooth"

block, generally, includes content classified as dark according to a dark content threshold or range in use.

An effective threshold between textured and smooth video content can vary depending on the type of content being encoded. For example, a threshold that effectively separates textured content from non-textured content in natural video may classify all blocks in animation video as non-textured, which hampers effective control of distortion in the animation video. In practice, an effective smooth/textured threshold for animation content is usually lower than an effective smooth/textured threshold for natural video, and the gradations between effectively different thresholds are finer for animation content.

A. Distinguishing Textured Content from Non-textured Content

In some embodiments, a tool such as a video encoder distinguishes textured content from non-textured content using a non-linear scale of texture thresholds. The non-linear scale embodies finer gradations of possible texture threshold values in some ranges, and embodies coarser gradations of possible texture threshold values in other ranges, which can help control encoding for different categories of content. Animation content usually includes relatively uniform regions of sample values, whereas natural video usually includes subtle or complex variations in sample values. In many encoding scenarios, coarse gradations of texture threshold values provide effective control over the smooth/textured classification for natural video, as different thresholds allow the user to designate slightly different proportions of content as textured. Such coarse gradations may be ineffective for animation content, however, if one threshold value results in the classification of most of the content as textured, and the next threshold value results in the classification of most of the content as non-textured, with no way to classify an intermediate proportion of content as textured. Conversely, threshold gradations that work effectively for animation content may be too fine for natural video, such that large changes in threshold value fail to change the proportion of content classified as textured. Using a scale of texture thresholds with non-linear gradations helps improve control of smooth/textured threshold classification for different categories of video content.

Figure 5:
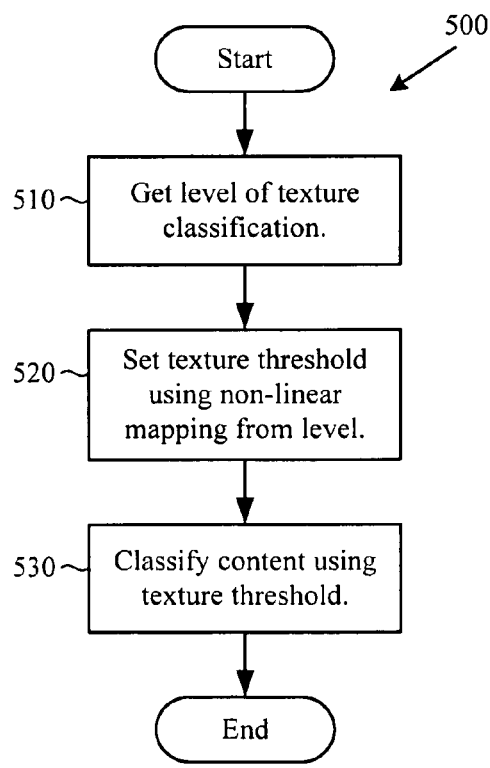
FIG. 5 is a flowchart illustrating a generalized technique for using texture thresholds separated by non-linear gradations when classifying content.

FIG. 5 shows a generalized technique (500) for using texture thresholds separated by non-linear gradations when classifying content. A tool such as the encoder (400) explained with reference to FIG. 4 or other tool performs the technique (500) as part of encoding or in another process.

First, the tool gets (510) a level of texture classification. For example, the tool gets (510) a level of texture classification specified by the user through a graphical user interface control of the tool. Using a slider bar or simple numerical scale, the user can set different levels of texture classification in an intuitive way, so as to control the proportion of content classified as textured versus non-textured. In a typical configuration, setting a lower level of texture classification results in more of the content being classified as textured, and setting a higher level results in less of the content being classified as textured. Alternatively, the tool gets (510) the level of texture classification through an encoding wizard, command line interface, or other way, or uses a default level of texture classification.

The tool then sets (520) a texture threshold using a non-linear mapping of possible values of the texture classification level to possible values of the texture threshold. According to an example non-linear mapping, lower levels of texture classification map to lower texture thresholds separated by finer gradations, and higher levels map to higher texture thresholds separated by coarser gradations. As a result, for relatively simple content such as animation content, finer gradations at low texture thresholds provide for effective differentiation of proportions of textured versus non-textured content. On the other hand, for more complex content such as natural video, the coarser gradations provide effective smooth/textured differentiation at higher texture thresholds. Alternatively, the non-linear mapping embodies other and/or additional rules. Generally, the tool sets (520) the texture threshold using a scale with non-linear gradations between possible values of the texture threshold. The non-linear gradations include finer gradations for some ranges and coarser gradations for other ranges, as desired according to a particular implementation.

The tool classifies (530) multiple units (e.g., blocks) of sample values using the texture threshold. For example, for each of the multiple units, the tool compares a texture metric to the texture threshold that was set. In an example implementation, the texture metric for a block is the sum of squared AC coefficients for the block, and the texture threshold is an AC energy threshold. Alternatively, the texture metric measures sum of differences between intensity values of a block and their average value, intensity variance (e.g., using sums of difference between adjacent sample values, or using an average gradient value, or using a median gradient value), and the threshold varies accordingly. For examples of alternative texture metrics, see U.S. Patent Application Publication No. US-2007-0248164-A1, entitled, "QUANTIZATION ADJUSTMENT BASED ON TEXTURE LEVEL." Alternatively, the tool uses another texture metric and corresponding texture threshold.

In the example implementation, the tool classifies macroblocks as textured or non-textured (pending further differentiation as dark smooth or other smooth) based on the classifications of their constituent blocks. A macroblock in 4:2:0 chroma sampling format includes four luma blocks and two chroma blocks. If any of the six blocks is classified as smooth/non-textured, the macroblock is classified as smooth/non-textured. Alternatively, the tool uses a different rule for classifying macroblocks, such as a rule based on whether or not a majority of the blocks in a macroblock are classified as smooth.

Although FIG. 5 shows the classifying (530) immediately following the setting (520) of the texture threshold, the tool set (520) the texture threshold on a session-by-session basis for encoding sessions. Alternatively, the tool sets the texture threshold during real-time encoding, from picture-to-picture during offline studio editing and encoding, or on some other basis. The tool can perform the classifying (530) on a picture-by-picture basis or other basis.

For an example mapping, the user of an encoding system selects a level l of texture classification, which the encoding system maps to a texture threshold t according to the relation:

$$t = 4096 * (l/\text{MAXLEVEL})^N \qquad (2).$$

MAXLEVEL indicates the maximum allowable level of texture classification, and N indicates a scaling factor. The values of MAXLEVEL and N depend on implementation. When N=1, the mapping of level l to threshold t is linear.

To speed up processing, the encoding system can include a table that associates level values with threshold values. The following table shows an approximate non-linear mapping of possible values of texture classification level l to possible values of texture threshold t when the scaling factor N is 1.5, and the maximum level value MAXLEVEL is 100.

| level l | threshold t | gap |
|---|---|---|
| 1 | 4 | |
| 2 | 12 | 7 |
| 3 | 21 | 10 |
| 4 | 33 | 11 |
| 5 | 46 | 13 |
| 6 | 60 | 14 |
| 7 | 76 | 16 |
| 8 | 93 | 17 |
| 9 | 111 | 18 |
| 10 | 130 | 19 |
| 11 | 149 | 20 |
| 12 | 170 | 21 |
| 13 | 192 | 22 |
| 14 | 215 | 23 |
| 15 | 238 | 23 |
| 16 | 262 | 24 |
| 17 | 287 | 25 |
| 18 | 313 | 26 |
| 19 | 339 | 26 |
| 20 | 366 | 27 |
| 21 | 394 | 28 |
| 22 | 423 | 28 |
| 23 | 452 | 29 |
| 24 | 482 | 30 |
| 25 | 512 | 30 |
| 26 | 543 | 31 |
| 27 | 575 | 32 |
| 28 | 607 | 32 |
| 29 | 640 | 33 |
| 30 | 673 | 33 |
| 31 | 707 | 34 |
| 32 | 741 | 34 |
| 33 | 776 | 35 |
| 34 | 812 | 36 |
| 35 | 848 | 36 |
| 36 | 885 | 37 |
| 37 | 922 | 37 |
| 38 | 959 | 38 |
| 39 | 998 | 38 |
| 40 | 1036 | 39 |
| 41 | 1075 | 39 |
| 42 | 1115 | 40 |
| 43 | 1155 | 40 |
| 44 | 1195 | 41 |
| 45 | 1236 | 41 |
| 46 | 1278 | 41 |
| 47 | 1320 | 42 |
| 48 | 1362 | 42 |
| 49 | 1405 | 43 |
| 50 | 1448 | 43 |
| 51 | 1492 | 44 |
| 52 | 1536 | 44 |
| 53 | 1580 | 45 |
| 54 | 1625 | 45 |
| 55 | 1671 | 45 |
| 56 | 1716 | 46 |
| 57 | 1763 | 46 |
| 58 | 1809 | 47 |
| 59 | 1856 | 47 |
| 60 | 1904 | 47 |
| 61 | 1951 | 48 |
| 62 | 2000 | 48 |
| 63 | 2048 | 49 |
| 64 | 2097 | 49 |
| 65 | 2146 | 49 |
| 66 | 2196 | 50 |
| 67 | 2246 | 50 |
| 68 | 2297 | 50 |
| 69 | 2348 | 51 |
| 70 | 2399 | 51 |
| 71 | 2450 | 52 |
| 72 | 2502 | 52 |
| 73 | 2555 | 52 |
| 74 | 2607 | 53 |
| 75 | 2660 | 53 |
| 76 | 2714 | 53 |
| 77 | 2768 | 54 |
| 78 | 2822 | 54 |
| 79 | 2876 | 54 |
| 80 | 2931 | 55 |
| 81 | 2986 | 55 |
| 82 | 3041 | 55 |
| 83 | 3097 | 56 |
| 84 | 3153 | 56 |
| 85 | 3210 | 56 |
| 86 | 3267 | 57 |
| 87 | 3324 | 57 |
| 88 | 3381 | 57 |
| 89 | 3439 | 58 |
| 90 | 3497 | 58 |
| 91 | 3556 | 58 |
| 92 | 3614 | 59 |
| 93 | 3674 | 59 |
| 94 | 3733 | 59 |
| 95 | 3793 | 60 |
| 96 | 3853 | 60 |
| 97 | 3913 | 60 |
| 98 | 3974 | 61 |
| 99 | 4036 | 61 |
| 100 | 4096 | 61 |

Alternatively, the tool distinguishes textured content from non-textured content using another approach. For example, the tool uses a static texture threshold or uses an adjustable texture threshold according to a scale with uniform gradations between possible values of the texture threshold.

B. Distinguishing Smooth Content from Dark Smooth Content

In some embodiments, a tool such as a video encoder distinguishes dark smooth content from other smooth content. This can help the tool control encoding quality of the dark smooth content relative to encoding quality of the other smooth content. Some types of distortion are more perceptible in dark smooth content than in other smooth content. Allocating bits in same way across all types of smooth content can result in perceptible distortion in dark smooth areas. Classifying picture content as smooth or dark smooth can facilitate allocation of available bits to the dark smooth content and other smooth content, so as to balance or otherwise control the perceptibility of distortion when distortion is introduced.

Figure 6:
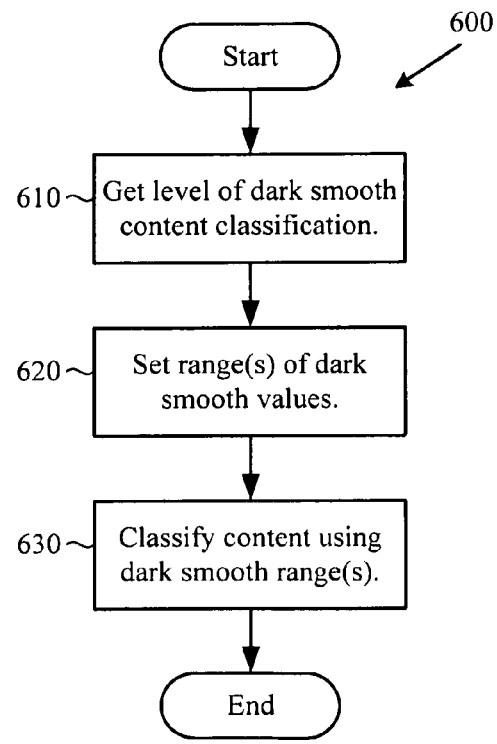
FIG. 6 is a flowchart illustrating a generalized technique for classifying non-textured content as smooth or dark smooth.

FIG. 6 shows a generalized technique (600) for classifying units (e.g., blocks) of sample values as smooth or dark smooth. A tool such as the encoder (400) explained with reference to FIG. 4 or other tool performs the technique (600) as part of encoding or in another process.

First, the tool gets (610) a level of dark smooth content classification. For example, the tool gets (610) a default level of dark smooth content classification or gets (610) a level of dark smooth content classification specified by a user through a graphical user interface control of the tool. If user control is desirable, the user can set different levels of dark smooth content classification to control the proportion of content classified as dark smooth versus smooth. In a typical configuration, setting a lower level results in less content being classified as dark smooth, and setting a higher level results in more of the content being classified as dark smooth. Alternatively, the tool gets (610) the level of dark smooth content classification through an encoding wizard, command line interface, or other way.

The tool sets (620) one or more ranges of dark smooth content values using the level of dark smooth content classification. Typically, for a conservative level, the range of dark smooth content values is smaller. Or, for a more aggressive level of dark smooth content classification, the range is larger and more content qualifies as dark smooth content.

The tool classifies (630) multiple units (e.g., blocks) of sample values using the range(s) for dark smooth content classification. In the example implementation, for each of the multiple units, the tool compares a metric to one of the ranges that was set. The metric for a block is the average intensity value or DC coefficient value for the block, and the range is a range of intensity values or DC coefficient values. For example, for default designation of content as dark smooth content, average luma intensity values between 16 and 40 indicate dark smooth content, and average chroma sample values are between 120 and 136 indicate dark smooth content. Or, for less aggressive designation of content as dark smooth content, the ranges are 16 to 28 for luma and 124 to 132 for chroma. Alternatively, the tool uses another darkness metric and corresponding ranges for dark smooth content.

In the example implementation, the tool classifies a macroblock as smooth/non-textured whether it includes dark smooth content or other smooth content, and uses other control parameters to regulate relative encoding quality of dark smooth content versus other smooth content. Alternatively, the tool classifies macroblocks as smooth or dark smooth based on the classifications of their constituent blocks. According to one alternative rule, if any of the blocks in a macroblock is classified as dark smooth, the macroblock is classified as dark smooth. Or, the tool uses a different rule for classifying macroblocks based on whether the macroblock includes more dark smooth blocks than other smooth blocks.

Although FIG. 6 shows the classifying (630) immediately following the setting (620) of the dark smooth content ranges, the tool can set (620) the ranges on a session-by-session basis for encoding sessions or use default ranges. Alternatively, the tool sets the ranges during real-time encoding, from picture-to-picture during offline studio editing and encoding (automatically distinguishing areas of dark smooth content can simplify and dramatically speed up the process of removing perceptible encoding artifacts in dark smooth areas), or on some other basis. The tool can perform the classifying (630) on a picture-by-picture basis or other basis.

C. Block-by-Block Classification as Textured, Dark Smooth or Smooth

Figure 7:
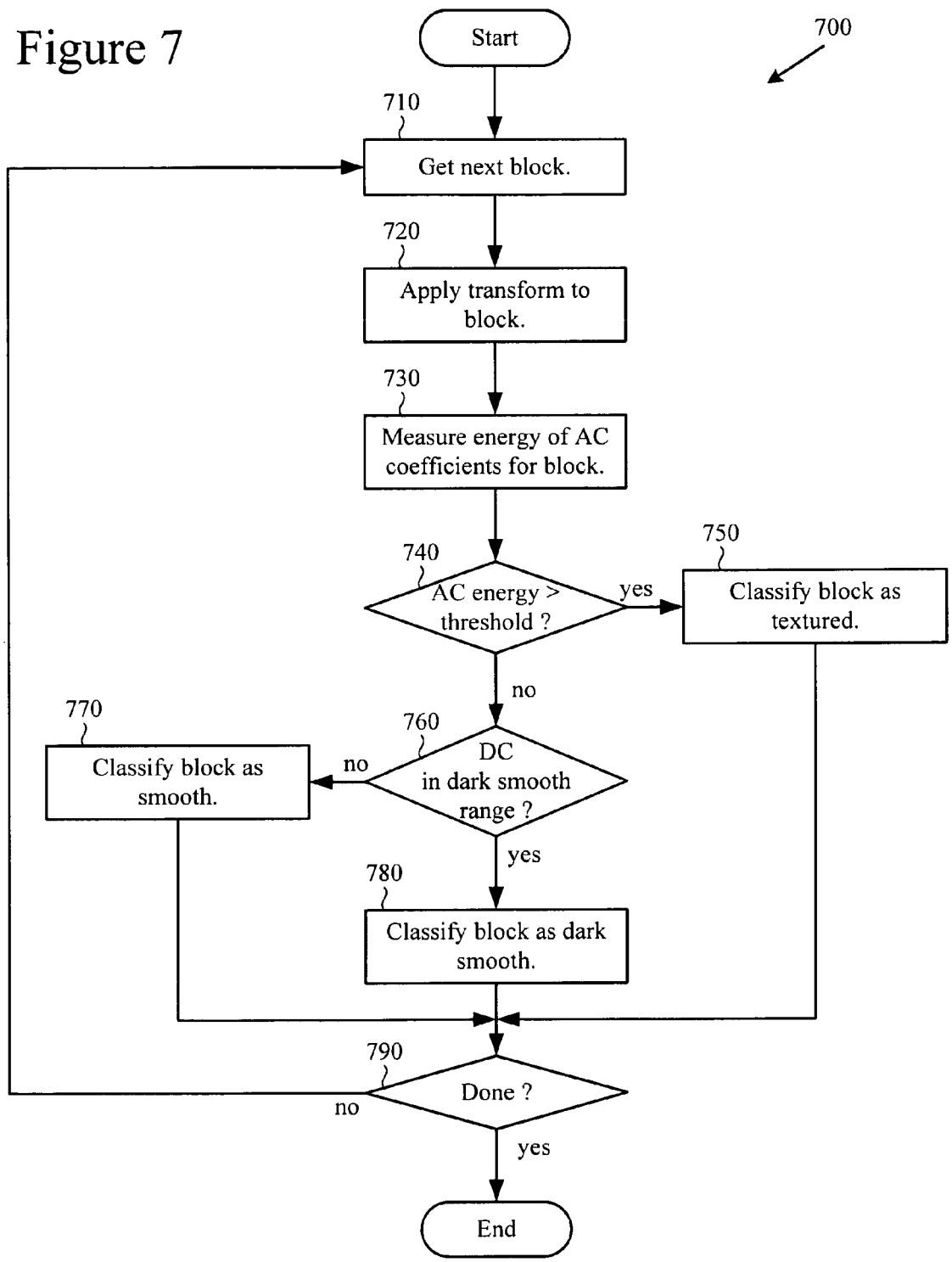
FIG. 7 is a flowchart illustrating an example technique for classifying blocks as textured, smooth or dark smooth.

FIG. 7 shows an example technique (700) for classifying blocks of video pictures as textured, smooth or dark smooth. A tool such as the encoder (400) explained with reference to FIG. 4 or other tool performs the technique (700) as part of encoding or in another process.

FIG. 7 shows classification of blocks in a picture on a block-by-block basis. To start, the tool gets (710) the next block and applies (720) a frequency transform to the sample values of the block. For example, the tool gets an 8×8 block and applies a frequency transform (such as a discrete cosine transform or similar transform) to the block to produce an 8×8 block of transform coefficients. Alternatively, the tool gets a block of a different size (e.g., 8×4, 4×8 or 4×4) and/or applies a different type of transform. In the 8×8 matrix of transform coefficients, the horizontal and vertical positions of coefficients correspond to horizontal and vertical frequencies, respectively, for the signal represented in the samples values of the 8×8 block. The coefficient shown by convention as the upper left coefficient (or (0, 0) coefficient) corresponds to the lowest frequency in both the vertical and horizontal directions, and is termed the DC coefficient for the block. The other coefficients are termed AC coefficients for the block. The AC coefficient shown by convention as the lower right coefficient (or (7, 7) coefficient) represents the highest horizontal and vertical frequency component for the 8×8 block.

The tool measures (730) the energy of the AC coefficients for the block and compares (740) the measured AC energy to a texture threshold. In an example implementation, the tool computes the sum of squares of the AC coefficients and compares the sum to a texture threshold. Alternatively, the tool computes another measure of AC energy or uses another texture metric, varying the texture threshold in use accordingly.

If the measured energy is above the texture threshold, the tool classifies (750) the block as textured. For blocks in a picture, the tool uses a higher texture threshold for luma blocks than for chroma blocks, since there is typically more AC energy in the luma plane than the chroma plane.

Otherwise, the block is deemed smooth (not textured) and the tool checks (760) whether the DC coefficient value of the block is within the range associated with dark smooth content. If so, the tool classifies (780) the block as dark smooth. Otherwise, the tool classifies (770) the block as just smooth. In the example implementation, if a chroma block is not textured, the tool classifies the chroma block as smooth or dark smooth depending on the DC coefficient values of the corresponding luma block(s) for the chroma block. If a majority of the corresponding luma blocks have DC coefficients in the dark smooth range, the tool classifies the chroma block as dark smooth, and otherwise the tool just classifies the chroma block as smooth. Alternatively, the tool uses another rule to classify chroma blocks as smooth or dark smooth depending on luma block classifications. Or, chroma blocks are individually classified, and the tool checks DC coefficients of chroma blocks against dark smooth content ranges.

After the tool classifies the block, the tool determines (790) whether to continue by getting (710) the next block. The encoder repeats the process on a block-by-block basis (as shown), macroblock-by-macroblock basis or other basis. Also, for the sake of simplicity, FIG. 7 does not show how the technique (700) interacts with other encoding processes such as frequency transformation, entropy encoding and rate control.

In the example implementation, the tool subsequently processes macroblocks or other areas of the picture using the block classifications. For example, the tool classifies a macroblock as textured or non-textured. If a macroblock is non-textured, the blocks of the macroblock can be further classified as smooth or dark smooth and thereby designated for special treatment in quantization. The tool uses other control parameters to process smooth blocks and dark smooth blocks differently within smooth/non-textured macroblocks. Alternatively, the tool directly classifies macroblocks as textured, dark smooth, or smooth.

The tool can record results of the classification using a map that indicates texture levels or otherwise identifies textured units (e.g., blocks, macroblocks) and non-textured units (e.g., blocks, macroblocks). Later processes can then use the map. Alternatively, later processes directly perform the classification.

IV. Adjusting Encoding Quality for Textured, Dark Smooth and Other Smooth Content In some embodiments, an encoder adjusts encoding quality for textured, dark smooth, and other smooth video content. A goal of the bit allocation techniques and tools described herein is to introduce distortion where it is less perceptible when distortion has to be introduced during encoding to satisfy encoding constraints.

A. Generalized Adjustment Techniques

Figure 8:
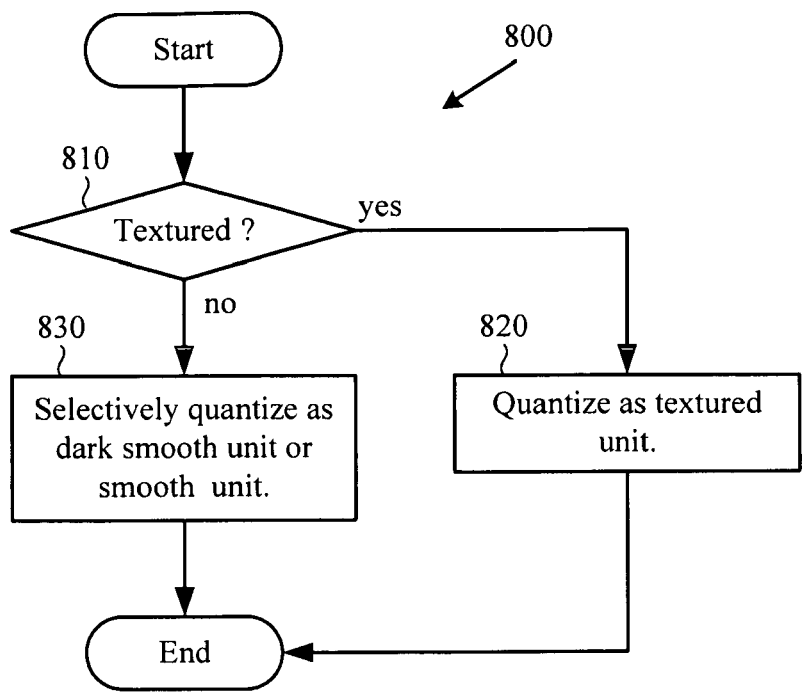
FIG. 8 is a flowchart illustrating a generalized technique for allocating bits between textured video content, dark smooth video content and other smooth video content.

FIG. 8 shows a generalized technique (800) for allocating bits between textured video content, dark smooth video content and other smooth video content. A tool such as the encoder (400) explained with reference to FIG. 4 or other tool performs the technique (800) as part of encoding.

FIG. 8 shows adjustment of encoding quality for a single unit of frequency coefficients. The technique (800) includes one path for control bit allocation in textured units, and another path for controlling bit allocation in smooth and dark smooth units. For the sake of simplicity, FIG. 8 does not show how the technique (800) interacts with other encoding processes such as frequency transformation and rate control.

The encoder determines (810) whether the unit being encoded is textured. If so, the encoder quantizes (820) the frequency coefficients of the unit using quantization for a textured unit. In an example implementation, for a textured macroblock, the encoder uses the quantization parameter ("QP") value at picture-level for the picture that includes the textured macroblock to quantize the frequency coefficients of the blocks of the macroblock. In doing so, the encoder can adapt the DZ size depending on the amount of texture in the unit. Alternatively, the encoder uses another approach to quantizing the textured unit. For example, see U.S. Patent Application Publication No. US-2007-0248164-A1.

If the unit is non-textured, the encoder selectively quantizes (830) the frequency coefficients of the unit using quantization for a dark smooth unit and/or using quantization for a smooth unit. In the example implementation, the encoder finds and uses a macroblock-level QP value for a non-textured macroblock to quantize the frequency coefficients of the blocks of the macroblock. On a block-by block basis, the encoder uses one or more control parameters (such as the TACL, TACC, TACLD and TACCD parameters described below) to regulate quantization of frequency coefficients in dark smooth blocks and smooth blocks. The encoder uses the macroblock-level QP for quantization of the respective blocks, adjusting DZ size from block to block. Alternatively, the encoder uses another approach to quantizing the non-textured unit. For example, if a unit (e.g., macroblock) is classified as smooth or dark smooth, the encoder determines whether the unit is classified as dark smooth. If so, the encoder quantizes the frequency coefficients of the unit using a QP and DZ size adapted to the dark smooth unit. Otherwise, the encoder quantizes the frequency coefficients of the unit using a QP and DZ size for a smooth unit.

The encoder repeats the technique (800) on a unit-by-unit basis or on some other basis. The encoder can use macroblock-level classifications for some decisions (e.g., smooth or textured) and use block-level classifications for other decisions (e.g., dark smooth or other smooth).

B. Example Implementation of Encoding Adjustments

Before detailing exemplary ways for encoders to adjust encoding quality for textured, dark smooth, and other smooth video content, this section describes quantization and inverse quantization rules in an example implementation.

1. Example QPs, Reconstruction Rules, and Quantization Rules

In an example implementation, a decoder (or encoder during encoder-side reconstruction) uses either of two different inverse quantization modes (also called reconstruction rules) when reconstructing AC coefficients for a block. The decoder or encoder uses a "uniform" quantizer reconstruction rule or a "non-uniform" quantizer reconstruction rule. The mode is specified for a picture, and all blocks in the picture use the same mode. The value of QP can vary within a picture for some encoding settings, and can take any integer value between 1 and 31 inclusive. The QP value is multiplied by a factor of 2 when used in inverse quantization. (The quantization factor can also be modified by a "halfQP" step, but for the sake of simplicity this halfQP step quantization is typically not addressed in the following discussion.)

According to the "uniform" quantizer reconstruction rule, the decoder or encoder reconstructs AC coefficients as follows:

$$C=2\times QP\times L \qquad (3),$$

where C is the reconstructed, inverse quantized AC coefficient, and L is the quantized level for the coefficient. Reconstruction points appear as circles in FIG. 9.

The quantization rules used to convert the AC coefficients to quantized levels L are not specified by the reconstruction rule (3). Rather, quantization rules, including placement of the quantization bin boundaries, are defined by the encoder. Suppose the distribution of AC coefficient values was uniform. For the "uniform" quantizer reconstruction rule, the corresponding quantization rule that would produce minimum distortion would be:

$$L=\text{sign}(C)\times((\text{abs}(C)+QP)//(2\times QP)) \qquad (4),$$

where sign(C)=−1 for C<0, and sign(C)=1 for C>=0. The // operation indicates integer division with rounding towards zero, and abs(C) indicates the absolute value of C. For many real-world encoding scenarios, however, the quantization rule shown in (4) does not provide optimal rate-distortion performance. For one thing, the distribution of values within quantization bins is typically not normal. Moreover, the quantization rules do not account for differences in the perceptibility of distortion in different situations. Thus, many encoders use different quantization rules, which vary depending on implementation.

Example quantization bin boundaries appear as dashed lines in FIG. 9. Compared to theoretical uniform quantization bins (which would appear at mid-points between reconstruction points), the boundaries shown in the top row of FIG. 9 are slightly further away from the zero-value point. In practice, the quantization bin boundaries used during quantization need not have been at the positions shown in FIG. 9. In the lower two rows of FIG. 9, the DZ is widened, without changing the other quantization thresholds.

According to the "non-uniform" quantizer reconstruction rule, the decoder or encoder reconstructs non-zero AC coefficients as follows:

$$C=(2\times L+1)\times QP \qquad (5).$$

Reconstruction points appear as circles in FIG. 10. In this mode, even for default settings, the quantization bin that includes the zero-value reconstruction point (the DZ) is much wider than the others. For the "non-uniform" quantizer reconstruction rule, a simple corresponding quantization rule would be:

$$L=\text{sign}(C)\times(\text{abs}(C)//(2\times QP)) \qquad (6).$$

Example quantization bin boundaries appear as dashed lines in FIG. 10. In the lower two rows of FIG. 10, the DZ is widened without modifying the other quantization thresholds.

Alternatively, the decoder/encoder uses more/fewer rules and/or different rules during reconstruction, and the encoder uses more/fewer rules and/or different rules during quantization. Generally, the parameterization of quantization parameters, quantization rules, and reconstruction rules can vary from implementation to implementation.

2. Example Approaches to Preserving AC Coefficients of a Block

In the example implementation, an encoder selectively preserves AC coefficients that have the most energy in a smooth or dark smooth block, so as to preserve encoding quality. The encoder selects a QP and DZ for the block such that N significant AC coefficients are preserved after quantization and inverse quantization, where N is an integer greater than or equal to 1 and less than the total number of AC coefficients for the block. Often, the preserved AC coefficients are coefficients for the lowest frequency AC basis functions of the transform, which characterize gradual value changes horizontally and/or vertically across a block. Preserving these AC coefficients tends to help perceived visual quality for the block, especially for smooth regions with low variation. The encoder selects a QP that preserves the desired number of the top-amplitude AC coefficients at acceptable quality. The N AC coefficients are preserved with a reasonable QP—typically not QP=1, which might result in allocation of more bits than necessary for the N AC coefficients. There can be situations (e.g., very flat blocks that lack N significant AC coefficients) in which the target number of AC coefficients is not preserved. In general, however, the encoder preserves AC coefficients without being overly aggressive in spending bits with smaller QPs.

In some cases, coefficients after the top N AC coefficients have values close to the $N^{th}$ AC coefficient. The encoder can reduce bit rate by adjusting the DZ threshold used for the given QP to quantize coefficients after the top NAC coefficients to zero. In general, DZ(QP) indicates a "cut-off" threshold for quantizing an AC coefficient to zero when the value of QP is used for quantization. For example, if the DZ range is −200 to +200 then a coefficient that is 197 would be quantized to L=0, and a coefficient that is 202 would be quantized to L=1.

In some encoders, the default DZ threshold DZ(QP) for a given QP is predetermined and proportional to the QP. Instead of using predetermined DZ thresholds when preserving N AC coefficients, the encoder can more aggressively set a DZ threshold. FIG. 9 shows three different cut-off thresholds for the uniform quantizer mode, one at the default placement of |6*QP/5|, one closer to the first reconstruction point, and one after the first reconstruction point. FIG. 10 shows three different cut-off thresholds for the non-uniform quantizer mode. In these examples, increasing the size of the DZ does not push the other quantizer thresholds further away from zero; it just results in more numbers close to zero being quantized to zero.

In the example implementation, the encoder adaptively adjusts the DZ size of a quantizer so as to preserve the N most significant AC coefficients in a block, which causes AC coefficients smaller than the $N^{th}$ largest AC coefficient (in absolute value) to be quantized to zero, even if they would otherwise be preserved using the normal DZ threshold for the selected QP. If the normal DZ threshold is |6*QP/5| for uniform quantization, for example, the encoder adjusts DZ threshold to be the absolute value of the $N^{th}$ most significant AC coefficient. This helps the video encoder selectively reduce bit rate, making bits available for use elsewhere in encoding.

FIG. 11 shows a block of frequency coefficients in which the DC coefficient and lower frequency AC coefficients have most of the signal energy for the block. In this example, the transform coefficients are in 12.4 format, meaning that the 12 most significant bits represent the integer portion of a coefficient, and the 4 least significant bits represent the fractional portion of the coefficient. The DC coefficient has a value of 296, and the most significant AC coefficients have values of −867, 311, −241, 202, 197, 188 and 105. The encoder selects a QP and DZ size to preserve a target number of AC coefficients. If N=4, the encoder selects a QP and DZ according to which the AC coefficients −867, 311, 241 and 202 are preserved. One option is to set QP=1 and use a relatively wide DZ to quantize the coefficients less than 202 to zero. While this preserves the four most significant coefficients, encoding these four coefficients can consume an inefficient number of bits. FIGS. 12A and 12B illustrate other options.

FIG. 12A illustrates more aggressive quantization that still preserves the top four AC coefficients in the block shown in FIG. 11. The encoder uses QP=6, for which the normal DZ threshold is 6*QP*16/5=115 (uniform quantizer mode). Using QP=6 and the default DZ preserves the four most significant coefficients (−867, 311, −241 and 202), but two other AC coefficients are also preserved (197 and 188). This reduces the bit rate associated with encoding the four most significant coefficients (QP=6 vs. QP=1) but includes AC coefficients over the target number.

FIG. 12B illustrates the aggressive quantization of FIG. 12A (QP=6) with further adjustment of the DZ to quantize to zero any AC coefficients after the four most significant AC coefficients. Two AC coefficients (188, 197) whose values are close to the $4^{th}$ most significant coefficient (202) are quantized to zero. This reduces the bit rate associated with encoding the four most significant coefficients (QP=6 vs. QP=1) and also limits the encoded AC coefficients to the target number.

In many cases, given the adjustment of the DZ to limit encoding to the target number of coefficients, a range of values of QP can provide acceptable performance. In the example shown in FIG. 11, QP values of 4, 5, 7 or 8 could be used to encode the four most significant AC coefficients with suitable quality.

In the example implementation, the encoder jointly determines the DZ threshold and QP as follows. The encoder sets the DZ size based upon the $N^{th}$ most significant AC coefficient. The encoder then computes a quantization step size as int(DZ/16), where int(x) returns the integer portion of the real number x, and the division by 16 accounts for the fractional component of the 12.4 format for AC coefficient values. The quantization step size is parameterized as 2*QP, and the encoder determines QP (and potentially halfQP) from the quantization step size.

For example, the encoder sets the DZ(QP) to be equal to the absolute value of the $N^{th}$ largest AC coefficient among the 63 AC coefficients for an 8×8 block. If N=2 and the $2^{nd}$ largest AC coefficient (in terms of absolute value) is −643, the encoder sets the DZ range to be −643 to +643. The two most significant AC coefficients are quantized to non-zero values, and the rest of the AC coefficients for the block are quantized to zero. The encoder then computes the quantization step size as int(659/16)=40, and determines that QP=20. If the $N^{th}$ largest AC coefficient can be preserved using a value of QP that exceeds the allowable range, the maximum value for QP can be used, or the QP value used for the picture including the block can be used.

3. Example Adjustments for Smooth and Dark Smooth Content

In the example implementation, an encoder selectively preserves AC coefficients in dark smooth and smooth units so as to preserve encoding quality for the AC coefficients. For each macroblock with one or more smooth or dark smooth blocks, the encoder selects a QP and DZ(s) such that there are at least N non-zero quantized AC coefficients per block of the macroblock.

When selecting the N most significant AC coefficients per block, the parameters that an encoder uses depend on implementation, and can help control bit allocation between dark smooth blocks and other smooth blocks. In the example implementation, the encoder uses a target number of AC coefficients for luma blocks of other smooth content ("TACL"), a target number of AC coefficients for chroma blocks of other smooth content ("TACC"), a target number of AC coefficients for luma blocks of dark smooth content ("TACLD"), and a target number of AC coefficients for chroma blocks of dark smooth content ("TACCD"). Alternatively, the encoder uses a different parameterization of target number(s) of AC coefficients for dark smooth blocks and other smooth blocks. For example, N is the same for chroma blocks and luma blocks of the macroblock, and N is the same for dark smooth blocks and other smooth blocks. Or, N is different for chroma blocks and luma blocks, but does not change depending on whether a block is dark smooth or other smooth. Or, N is different for dark smooth blocks and other smooth blocks, but does not change depending on whether a block is luma or chroma.

Depending on implementation, an encoder can change TACL, TACC, TACLD, and TACCD on a picture-by-picture basis or on some other basis, using feedback from a rate controller and/or user settings. The encoder can use a single target number of AC coefficients ("TAC") for a picture, with TACL, TACC, TACLD, and TACCD in turn depending on the picture-level value TAC. One possible configuration is TACL=TAC, TACC=int(TAC/2), TACLD=TAC+2, and TACCD=int((TAC+2)/2). Other configurations use other relations between the control parameters.

Figure 13:
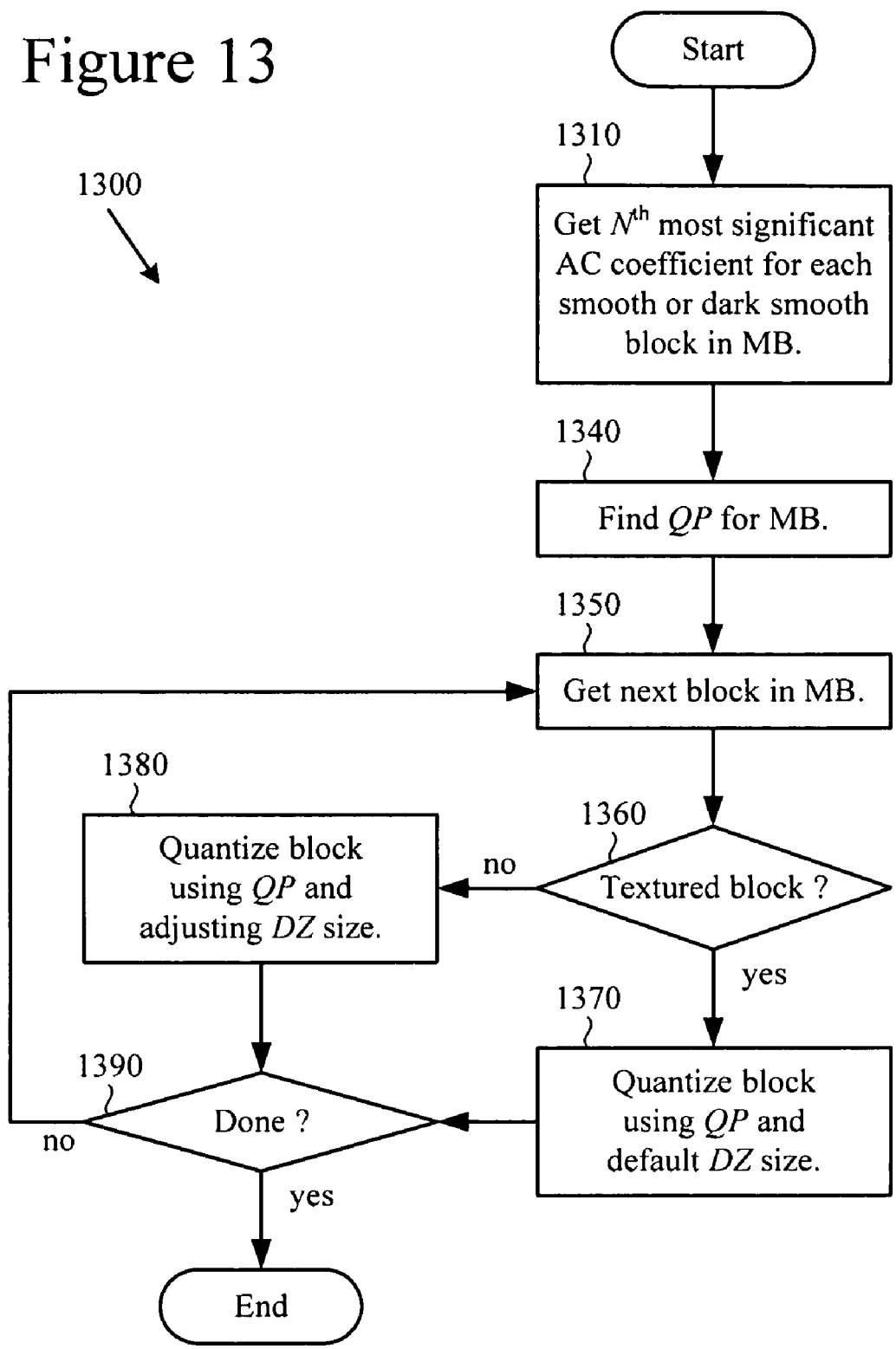
FIG. 13 is a flowchart illustrating an example technique for setting quantization parameter values and DZ size for quantization of macroblocks with dark smooth or other smooth blocks.

FIG. 13 shows an example technique (1300) for determining QP and DZ size(s) for macroblocks that include dark smooth blocks or other smooth blocks. A tool such as the encoder (400) explained with reference to FIG. 4 or other tool performs the technique (1300) as part of encoding.

FIG. 13 shows determination of QP and DZ size for a single macroblock. The technique (1300) shown in FIG. 13 can be used in a way that integrates quantization and rate control. For the sake of simplicity, however, FIG. 13 does not show how the technique (1300) interacts with other encoding processes such as frequency transformation, texture/dark smooth/smooth classification, and rate control.

First, the encoder gets (1310) the $N^{th}$ most significant AC coefficient for each dark smooth or other smooth block in the macroblock. The encoder can use a texture map or other record of block classifications, or compute block classifications at this time. So, if an encoder using TACL, TACC, TACLD, and TACCD encodes a macroblock with two dark smooth luma blocks, two other smooth luma blocks, and two dark smooth chroma blocks, the encoder uses the appropriate one of TACL, TACLD, or TACCD to get the $N^{th}$ most significant AC coefficient value for each of the blocks in the macroblock, where TACL, TACLD, and TACCD potentially yield different values of N.

The encoder then finds (1340) a value for QP for the macroblock. The encoder finds a value for QP that preserves the N most significant coefficients for each dark smooth or other smooth block in the macroblock. So, if an encoder uses TACL, TACC, TACLD, and TACCD, the encoder finds a QP that satisfies the applicable one of TACL, TACC, TACLD, and TACCD for every block in the macroblock, depending on whether the respective blocks are dark smooth, other smooth, or textured, and depending on whether the respective blocks are luma or chroma. For example, the encoder determines the lowest amplitude $N^{th}$ AC coefficient (min_Nth_AC) among the dark smooth blocks and other smooth blocks of the macroblock. If Y_block1_AC(TACLD), Y_block2_AC (TACLD), Y_block3_AC(TACL), Y_block4_AC(TACL), U_block_AC(TACCD), and V_block_AC(TACCD) represent the $N^{th}$ AC coefficients for a set of dark smooth and other smooth blocks of a macroblocks, respectively, min_Nth_AC=minimum (Y_block1_AC(TACLD), Y_block2_AC(TACLD), Y_block3_AC(TACL), Y_block4_AC(TACL), U_block_AC(TACCD), and V_block_AC(TACCD)). The encoder then determines a QP from min_Nth_AC using a mechanism described in the previous section. If a quantization step size based on QP preserves min_Nth_AC, it also preserves the $N^{th}$ AC coefficient for the respective other blocks in the macroblock. Thus, the encoder finds a QP for the macroblock directly from the smallest of the $N^{th}$ AC coefficients of any dark smooth blocks or smooth blocks in the macroblock.

Alternatively, to find (1340) the QP for a macroblock, the encoder compares min_Nth_AC with the default DZ(QP) for candidate values of QP. The encoder starts with the picture QP and decreases QP until a minimum QP for the quantizer is reached (e.g., QP=1) or the condition |min_Nth_AC|>=DZ (QP) is satisfied for the default DZ(QP). If the condition is satisfied, the encoder sets the threshold QP for the macroblock to be the first QP (i.e., highest qualifying QP) that satisfies the condition.

Next, the encoder quantizes the blocks of the macroblock using the QP for the macroblock. The encoder gets (1350) the next block to quantize in the macroblock and determines (1360) whether the block is textured or non-textured. If the block is textured, the encoder quantizes (1370) the block using the picture-level QP and the default DZ threshold for QP. Alternatively, the encoder adapts the DZ threshold used depending on the texture content of the textured block.

If the block is not textured, the encoder quantizes (1380) the block using the macroblock-level QP and adjusting the DZ threshold. In doing so, the encoder can increase the DZ threshold for the block to quantize to zero any coefficients after the $N^{th}$ AC coefficient in the block, where N depends on TACL, TACC, TACLD, or TACCD, or is otherwise set by the encoder. The encoder then determines (1390) whether to continue by getting (1350) the next block in the macroblock or ending. Thus, for each smooth or dark-smooth block, the encoder determines the DZ threshold that preserves target number of AC coefficients, for example, using the appropriate TAC parameter.

4. Signaling Quantization Parameters

In the example implementation, the encoder signal macroblock-level QP values for non-textured macroblocks using differential quantization relative to picture-level QP values. The encoder quantizes textured blocks in a picture using the picture-level QP value, and it signals the picture-level QP value and reconstruction rule for the picture as part of a picture header. For a non-textured macroblock in a picture, the encoder signals the macroblock-level QP value for the macroblock as part of a macroblock header. (The picture-level reconstruction rule is used for the non-textured macroblocks in the picture.) The macroblock-level QP value can be encoded as a difference (e.g., a reduction in QP value) relative to the applicable picture-level QP value.

Alternatively, the encoder uses another mechanism to signal quantization parameters for textured content and non-textured content.

V. Setting Control Parameters for Bit Allocation

In some embodiments, an encoder sets bit allocations for adjusting encoding quality of textured content, dark smooth content, and other smooth content using a multi-pass approach. In an example implementation, the encoder uses QP, TACL, TACC, TACLD, and TACCD as control parameters for bit allocations. Alternatively, the encoder uses other control parameters.

In the example implementation, an encoder sets bit allocations in peak-bit-rate-constrained, variable-bit-rate encoding scenarios. When encoding a video sequence, the encoder sets an average bit rate target (e.g., corresponding to an average network connection rate or average transmission rate), a peak bit rate (e.g., corresponding to a peak network connection rate or peak transmission rate), and a buffer size (e.g., corresponding to a notional encoder output buffer size or actual decoder input buffer size). The encoder controls encoding so that the resulting bit stream of compressed video information conforms to the average bit rate and the buffer level does not underflow. Stated differently, the encoder controls encoding so that the total size of the encoded video (indicated by the target bit rate x the duration of the video sequence) matches a target size. The buffer level drops when the current bit rate exceeds the peak bit rate (since the buffer is not replenished fast enough), so the buffer size affects how long the peak bit rate can be exceeded. Alternatively, an encoder sets bit allocations in other encoding scenarios.

Figure 14:
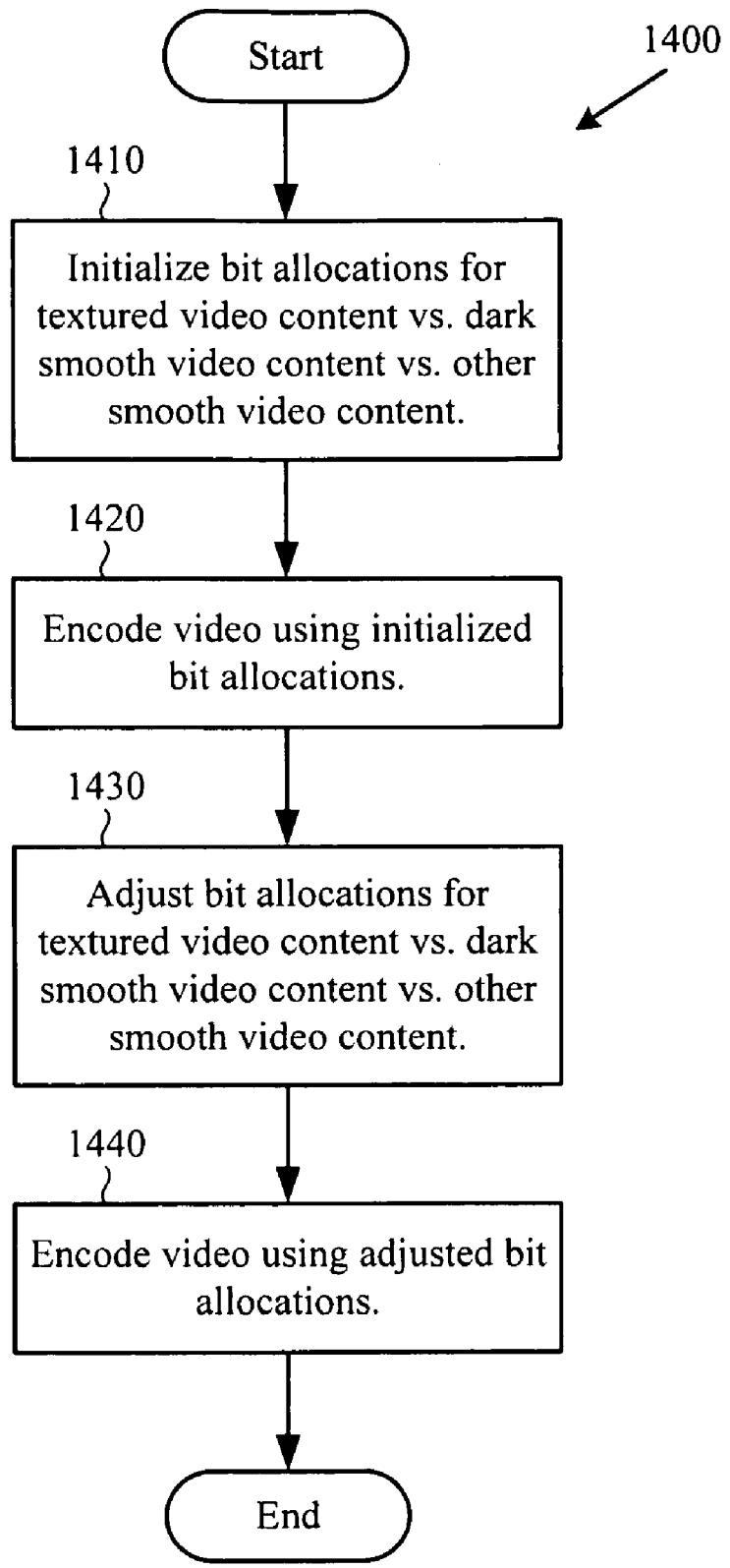
FIG. 14 is a flowchart illustrating a generalized technique for setting relative bit allocations for textured video content, dark smooth video content and other smooth video content.

FIG. 14 shows a technique (1400) for setting relative bit allocations for textured video content, dark smooth video content and other smooth video content. In particular, FIG. 14 shows a multi-pass rate control process in which an encoder sets bit allocations for smooth content relative to dark smooth content. A tool such as the encoder (400) explained with reference to FIG. 4 or other tool performs the technique (1400) as part of encoding.

First, the encoder initializes (1410) bit allocations for textured video content versus dark video content versus other smooth video content. In the example implementation, the encoder initializes QP, TACL, TACC, TACLD, and TACCD parameters to have initial values. TACL, TACC, TACLD, and TACCD can all have different initial values, or they can have the same initial value, depending on how the encoder is implemented. To increase the encoding quality of dark smooth content relative to other smooth content, the encoder can increase TACLD and TACCD relative to TACL and TACC, respectively.

$$TACLD=TACL+x \qquad (6), \text{ and}$$

$$TACCD=TACC+x \qquad (7),$$

where x is an encoder setting, possibly exposed to the user, such as 1, 2, 3, etc. Another common approach is to have the luma control parameters vary relative to the chroma control parameters.

$$TACC=TACL/y \qquad (8),$$

where y is an encoder setting, possibly exposed to the user, such as 1.5, 2, 2.5, etc. Alternatively, the encoder establishes other relations between the control parameters. Although the encoder separately tracks TACL, TACC, TACLD, and TACCD, they can vary together. In one possible configuration, the encoder sets QP=4 and TACL=TACC=TACLD=TACCD=4 for the first pass encoding. Alternatively, the encoder initializes other and/or different control parameters.

Then, the encoder encodes (1420) the video using the initialized bit allocations. In the example implementation, the encoder encodes the video and keeps the values of the parameters QP, TACL, TACC, TACLD, and TACCD constant throughout first pass encoding. During the encoding, the encoder classifies units of the video as textured, dark smooth or smooth, and the encoder tracks the bits used encoding textured content, dark smooth content, and other smooth content.

The encoder adjusts (1430) bit allocations for the textured video content versus dark video content versus other smooth video content. In the example implementation, the encoder adjusts values of the QP, TACL, TACC, TACLD, and TACCD parameters depending on the results of the first pass of encoding. The encoder can adjust the control parameters in view of the actual bit counts from the first pass encoding and the target bit rate. In the example implementation, the encoder compares the total actual size A of the first pass encoding results to the target size T for the encoding, which is obtained by multiplying the target (average) bit rate by the time duration of the video sequence. The encoder computes the ratio of T to A: R=T|A. The encoder uses the ratio R to scale bit allocations for textured, dark smooth, and other smooth content for second pass encoding.

For example, if the target size T is 1 GB and the actual size A after the first pass is 2 GB, then the ratio R=0.5. The encoder uses the ratio R to scale the control factors QP, TACL, TACC, TACLD and TACCD. The encoder adjusts the control parameter QP under the assumption that texture bits scale inversely with QP. So, for this example, the encoder adjusts QP to be 4/0.5=8. For each frame, the desired average number of texture bits allocated in the frame is half of the number that was produced in the frame for the first pass. The encoder adjusts the control parameters TACL, TACC, TACLD and TACCD under the assumption that smooth bits scale directly with the target number of coefficients. So, for this example, for each frame, the encoder adjusts the number of smooth and dark-smooth bits allocated to the frame to be half what was produced in the frame for the first pass. To achieve this allocation, the encoder directly scales the control parameters TACL, TACC, TACLD and TACCD by the ratio R, multiplying the initial value of each of the TAC parameters by 0.5. If the initial values of TACL, TACC, TACLD, and TACCD are TACL=4, TACC=2, TACLD=6, and TACCD=4, the adjusted values are TACL=2, TACC=1, TACLD=3, and TACCD=2. Alternatively, the encoder adjusts the control parameters using another approach, for example, changing control parameters on a picture-by-picture basis or some other basis.

The encoder then encodes (1440) the video using the adjusted bit allocations. In the example implementation, the encoder uses the adjusted control parameters QP, TACL, TACC, TACLD and TACCD to control macroblock-level QP values for non-textured macroblocks and to control DZ sizes for blocks of dark smooth or other smooth content. The encoder uses the same encoding tools for the first pass and second pass (e.g., same transform, same texture metrics, same thresholds for textured/non-textured content) and can reuse information such as classifications. Alternatively, the encoder uses different encoding tools.

Alternatively, the encoder uses the adjusted values of the QP, TACL, TACC, TACLD, and TACCD parameters as guidelines in the second pass encoding, but varies QP as needed to meet target bit rate constraints or other encoding constraints during the second pass encoding. If the encoding constraints are not satisfied using the adjusted values of the QP, TACL, TACC, TACLD, and TACCD parameters, the encoder incrementally increases or decreases the QP values used at picture level and/or macroblock level for rate control.

After the second pass encoding, the control parameters TACL, TACC, TACLD, and TACCD can be fine-tuned, if desired, to control bit allocations on a scene-by-scene, frame-by-frame or other basis. The encoder then encodes the video using the fine-tuned control parameters.

In the example implementation, the encoder effectively controls bit allocation of textured, dark smooth and other smooth content, and can expose control of the bit allocation to a user. The encoder controls bits allocated to textured blocks by adjusting picture-level QP values, controls bits allocated to dark smooth blocks by adjusting TACLD and TACCD, and controls bits allocated to smooth blocks by adjusting TACL and TACC. Roughly speaking, encoding that uses a QP value of $QP_1$ produces Z times as many bits as encoding that uses a QP value of $QP_1*Z$. (So, encoding using a QP value of 4 is expected to produces twice as many bits as encoding using a QP value of 8.) Likewise, encoding that uses a TAC value of $TAC_1*Z$ is expected to produce roughly Z times as many bits as encoding that uses a TAC value of $TAC_1$. (So, encoding using a TAC value of 4 is expected to produce twice as many bits as encoding using a TAC value of 2.) Given these basic relations, the encoder modulates bit allocation for textured, smooth and dark smooth regions by adjusting the values of QP, TACL, TACC, TACLD and TACCD.

Alternatively, an encoder uses another approach to setting control parameters for adjusting encoding quality of textured content, dark smooth content, and other smooth content using a multi-pass approach.

VI. Alternatives

Although much of the preceding description focuses on block-based video encoding applications, the described techniques and tools have uses in areas other than video encoding. For example, the described techniques and tools for content classification can be used for image encoding and other types of image processing.

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A method comprising:
   for each of plural units of a picture:
      analyzing content of the unit; and
      using a computer, assigning a classification to the unit based at least in part on results of the analyzing the content of the unit;
   using the classifications to process the plural units, wherein the classification for at least one of the plural units is a first classification type, and wherein the classification for at least one of the plural units is a second classification type indicating darker content than the first classification type; and
   outputting a result of the processing;
   wherein the assigning the classification to the unit includes:
   comparing energy of AC coefficients for the unit to a threshold, wherein the unit is classified as a third classification type if the energy is higher than the threshold, the third classification type indicating textured content, and the first and second classification types indicating smooth content.

2. The method of claim 1 wherein the assigning includes classifying the unit as the first classification type or the second classification type depending on average sample intensity value for the unit.

3. The method of claim 1 further comprising setting the threshold using a level of texture classification specified according to user input received through a user interface control.

4. The method of claim 3 wherein the setting uses a non-linear mapping of possible values of level of texture classification to possible values of the threshold.

5. The method of claim 1 further comprising setting one or more parameters to control bit allocation for the second classification type relative to the first classification type during encoding of the plural units.

6. The method of claim 5 wherein the one or more parameters include a target AC coefficient count for the encoding of the at least one of the plural units classified as the second classification type.

7. The method of claim 5 wherein the one or more parameters include separate control parameters for luma units of the second classification type and chroma units of the second classification type.

8. The method of claim 5 wherein the encoding includes:
   using the one or more parameters and the classifications, determining how to quantize the plural units; and
   quantizing the plural units.

9. The method of claim 5 wherein the setting the one or more parameters comprises:
   in a preliminary pass, encoding the plural units using initial values for the one or more parameters; and
   adjusting values of the one or more parameters based at least in part upon results of the encoding using the initial values in the preliminary pass.

10. A method of encoding plural video units, the method comprising:
    setting one or more parameters to control bit allocation for a first classification type relative to a second classification type during encoding of plural video units, the second classification type indicating darker content than the first classification type, wherein the setting includes:
       in a first pass, encoding, using a computer, the plural video units using initial values for the one or more parameters; and
       adjusting values of the one or more parameters based at least in part upon results of the encoding using the initial values in the first pass;
    in a second pass, encoding the plural video units using the adjusted values; and
    outputting the encoded plural video units from the second pass in a bit stream.

11. The method of claim 10 wherein the one or more parameters include a first target AC coefficient count for the first classification type and a second target AC coefficient count for the second classification type.

12. The method of claim 10 wherein the one or more parameters include a first target AC coefficient count for luma sample values of the second classification type and a second target AC coefficient count for chroma sample values the second classification type.

13. The method of claim 10 wherein the adjusting the values of the one or more parameters includes changing the initial values based at least in part upon target bit rate and resulting bit rate of the encoding in the first pass.

14. The method of claim 10 wherein the first classification type and the second classification type indicate non-textured content, wherein the encoding in the first pass and the encoding in the second pass include classifying the plural video units, and wherein:
    the classification for at least one of the plural video units is a third classification type indicating textured content, the classification for at least one of the plural video units is the first classification type, and the classification for at least one of the plural video units is the second classification type.

15. The method of claim 14 wherein the classifying uses a texture threshold, the method further comprising:

receiving input that specifies a level of texture classification; and assigning a value to the texture threshold based at least in part upon the level, wherein the assigning uses a non-linear mapping of possible values of the level of texture classification to possible values of the texture threshold.

16. A video encoding system comprising:

a user interface module adapted to receive user input that indicates a level of texture classification;

an encoding control module adapted to set a texture threshold based at least in part upon the level of texture classification and using a non-linear mapping of possible values of level of texture classification to the possible values of the texture threshold, wherein the texture threshold is an AC energy threshold;

one or more video encoding modules adapted to encode video using the texture threshold.

17. The system of claim 16 wherein the non-linear mapping embodies finer gradations for simpler content and coarser gradations for more complex content.

18. The system of claim 16 wherein the video encoding includes:

classifying plural units of the video as textured, dark smooth or smooth; and using the classifications to allocate bits between the plural units during the encoding.

19. The system of claim 16 wherein the one or more video encoding modules include a module adapted to set parameters to control bit allocation between textured content, dark smooth content, and other smooth content during the encoding.

* * * * *